(12) United States Patent
Kim et al.

(10) Patent No.: US 11,735,788 B2
(45) Date of Patent: *Aug. 22, 2023

(54) ENERGY STORAGE MODULE INCLUDING INSULATION SPACERS AND AN EXTINGUISHER SHEET

(71) Applicant: Samsung SDI Co., Ltd., Yongin-si (KR)

(72) Inventors: Jin Taek Kim, Yongin-si (KR); Eun Ok Kwak, Yongin-si (KR); Jang Hoon Kim, Yongin-si (KR); Jin Bhum Yun, Yongin-si (KR); Jong Yeol Woo, Yongin-si (KR); Kwang Deuk Lee, Yongin-si (KR); Woo Sung Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/901,538

(22) Filed: Jun. 15, 2020

(65) Prior Publication Data

US 2021/0075075 A1 Mar. 11, 2021

(30) Foreign Application Priority Data

Sep. 5, 2019 (KR) ........................ 10-2019-0110365

(51) Int. Cl.
*H01M 10/658* (2014.01)
*H01M 10/647* (2014.01)
(Continued)

(52) U.S. Cl.
CPC ....... *H01M 10/658* (2015.04); *H01M 10/425* (2013.01); *H01M 10/4207* (2013.01);
(Continued)

(58) Field of Classification Search
CPC ............. H01M 10/658; H01M 10/647; H01M 10/4207; H01M 10/425; H01M 50/24; H01M 50/30; H01M 50/40; H01M 50/20
See application file for complete search history.

(56) References Cited

U.S. PATENT DOCUMENTS 5,047,272 A 9/1991 Hassel et al.
5,817,434 A 10/1998 Brooker et al.
(Continued)

FOREIGN PATENT DOCUMENTS

CN 102468463 A 5/2012
CN 106654462 A 5/2017
(Continued)

OTHER PUBLICATIONS

The Engineering ToolBox, "https://www.engineeringtoolbox.com/density-materials-d_1652.html", Aug. 30, 2021 (Year: 2021).*
(Continued)

*Primary Examiner* — Jimmy Vo
(74) *Attorney, Agent, or Firm* — Lewis Roca Rothgerber Christie LLP

(57) ABSTRACT

An energy storage module includes a plurality of battery cells, each including a vent; a plurality of insulation spacers, at least one of the insulation spacers being located between long side surfaces of each adjacent pair of the battery cells; a cover member including an internal receiving space; a top plate coupled to a top portion of the cover member and including ducts respectively corresponding to the vents of the battery cells, and opening holes respectively corresponding to the insulation spacers; a top cover coupled to a top portion of the top plate and including discharge holes respectively corresponding to the ducts; and an extinguisher sheet located between the top cover and the top plate, configured to emit a fire extinguishing agent at a temperature
(Continued)

exceeding a certain temperature, and including opening holes positioned to correspond to the ducts.

15 Claims, 19 Drawing Sheets

(51) Int. Cl.
  *H01M 50/24* (2021.01)
  *H01M 50/30* (2021.01)
  *H01M 50/40* (2021.01)
  *H01M 50/20* (2021.01)
  *H01M 10/42* (2006.01)

(52) U.S. Cl.
  CPC ......... *H01M 10/647* (2015.04); *H01M 50/20* (2021.01); *H01M 50/24* (2021.01); *H01M 50/30* (2021.01); *H01M 50/40* (2021.01)

(56) References Cited

U.S. PATENT DOCUMENTS

| | | | |
|---|---|---|---|
| 6,136,423 | A | 10/2000 | Fitzpatrick |
| 6,365,299 | B1 | 4/2002 | Miyaki et al. |
| 7,385,480 | B2 | 6/2008 | Fitzpatrick |
| 8,597,808 | B2 | 12/2013 | Park et al. |
| 8,652,666 | B2 | 2/2014 | Kim |
| 9,406,917 | B2 | 8/2016 | Petzinger |
| 9,627,663 | B2 | 4/2017 | Kim |
| 10,164,229 | B2 | 12/2018 | Ohshiba et al. |
| 10,355,326 | B2 | 7/2019 | Petzinger |
| 10,930,910 | B2 | 2/2021 | Fujiwara et al. |
| 11,145,933 | B2 | 10/2021 | Kim et al. |
| 11,185,726 | B2 | 11/2021 | Lee |
| 2002/0179552 | A1 | 12/2002 | Marraffa |
| 2003/0134203 | A1 | 7/2003 | Fan et al. |
| 2007/0164711 | A1 | 7/2007 | Kim et al. |
| 2010/0167115 | A1* | 7/2010 | Okada .................. H01M 50/24 429/99 |
| 2010/0248026 | A1 | 9/2010 | Hinoki et al. |
| 2011/0005781 | A1 | 1/2011 | Yasui et al. |
| 2011/0165454 | A1 | 7/2011 | Iwamoto et al. |
| 2011/0274951 | A1 | 11/2011 | Yasui et al. |
| 2011/0313084 | A1 | 12/2011 | Furar et al. |
| 2012/0114993 | A1 | 5/2012 | Park et al. |
| 2012/0270083 | A1 | 10/2012 | Kim |
| 2013/0011701 | A1 | 1/2013 | Petzinger |
| 2013/0052452 | A1 | 2/2013 | Lee et al. |
| 2013/0264077 | A1 | 10/2013 | Jung |
| 2013/0313466 | A1 | 11/2013 | Bliznets et al. |
| 2014/0170447 | A1 | 6/2014 | Woehrle et al. |
| 2014/0322566 | A1 | 10/2014 | Kim |
| 2015/0064514 | A1* | 3/2015 | Wu ....................... H01M 50/20 429/56 |
| 2015/0099191 | A1 | 4/2015 | Liu et al. |
| 2015/0221914 | A1* | 8/2015 | Page .................... H01M 50/394 429/82 |
| 2015/0280193 | A1 | 10/2015 | Ohshiba et al. |
| 2015/0303421 | A1 | 10/2015 | Tazawa et al. |
| 2016/0049626 | A1 | 2/2016 | Yasui et al. |
| 2016/0104880 | A1 | 4/2016 | Gao et al. |
| 2016/0218333 | A1 | 7/2016 | Takasaki et al. |
| 2016/0254515 | A1 | 9/2016 | Shimoda et al. |
| 2016/0268564 | A1 | 9/2016 | Cho et al. |
| 2016/0315361 | A1 | 10/2016 | Petzinger |
| 2017/0165513 | A1 | 6/2017 | Li |
| 2017/0334310 | A1 | 11/2017 | Yokoyama et al. |
| 2018/0026245 | A1 | 1/2018 | Page et al. |
| 2018/0190956 | A1 | 7/2018 | Lica et al. |
| 2018/0248160 | A1 | 8/2018 | Lee |
| 2018/0269440 | A1 | 9/2018 | Lee et al. |
| 2018/0294516 | A1 | 10/2018 | Huang et al. |
| 2018/0309107 | A1 | 10/2018 | Widener |
| 2019/0109331 | A1 | 4/2019 | Skala |
| 2019/0168037 | A1 | 6/2019 | Lian et al. |
| 2019/0168615 | A1 | 6/2019 | Besson et al. |
| 2019/0173074 | A1 | 6/2019 | Ogawa et al. |
| 2019/0181419 | A1 | 6/2019 | Suba et al. |
| 2019/0305391 | A1 | 10/2019 | Petzinger |
| 2019/0334143 | A1 | 10/2019 | Sugeno |
| 2020/0014027 | A1 | 1/2020 | Ha et al. |
| 2020/0014078 | A1 | 1/2020 | Ha et al. |
| 2020/0168884 | A1 | 5/2020 | Wang et al. |
| 2020/0243823 | A1 | 7/2020 | Morita et al. |
| 2020/0287180 | A1 | 9/2020 | Chen et al. |
| 2020/0303701 | A1 | 9/2020 | Kim et al. |
| 2020/0350557 | A1 | 11/2020 | Ha et al. |
| 2020/0350566 | A1 | 11/2020 | Ha et al. |
| 2020/0350567 | A1 | 11/2020 | Ha et al. |
| 2020/0350568 | A1 | 11/2020 | Lee et al. |
| 2020/0350574 | A1 | 11/2020 | Ha et al. |
| 2020/0350580 | A1 | 11/2020 | Ha et al. |
| 2020/0350632 | A1 | 11/2020 | Ha et al. |
| 2020/0377690 | A1 | 12/2020 | Ootsuki et al. |
| 2021/0013460 | A1 | 1/2021 | Ootsuki et al. |
| 2021/0296625 | A1 | 9/2021 | Li et al. |
| 2021/0320337 | A1 | 10/2021 | Chen et al. |
| 2021/0328281 | A1 | 10/2021 | Chu et al. |
| 2021/0328304 | A1 | 10/2021 | You et al. |
| 2022/0059902 | A1 | 2/2022 | Jiang et al. |
| 2022/0069411 | A1 | 3/2022 | Wakabayashi et al. |
| 2022/0140434 | A1 | 5/2022 | Yoshida et al. |
| 2022/0149477 | A1 | 5/2022 | Yoshida et al. |
| 2022/0149478 | A1 | 5/2022 | Egashira et al. |

FOREIGN PATENT DOCUMENTS

| | | |
|---|---|---|
| CN | 106785225 A | 5/2017 |
| CN | 206564279 U | 10/2017 |
| CN | 206584999 U | 10/2017 |
| CN | 206834290 U | 1/2018 |
| CN | 207199806 U | 1/2018 |
| CN | 107887550 A | 4/2018 |
| CN | 207199806 U | 4/2018 |
| CN | 207977389 U | 10/2018 |
| CN | 109585726 A | 4/2019 |
| EP | 3 386 003 A1 | 10/2018 |
| EP | 3 591 737 A1 | 1/2020 |
| EP | 3 866 233 A1 | 8/2021 |
| JP | 6245038 B2 | 11/2015 |
| JP | 2016-110881 A | 6/2016 |
| JP | 6390062 B2 | 6/2016 |
| JP | 2019-213332 A | 12/2019 |
| KR | 10-1067627 B1 | 5/2008 |
| KR | 10-2012-0049020 A | 5/2012 |
| KR | 10-2012-0119407 A | 10/2012 |
| KR | 10-2014-0127743 A | 11/2014 |
| KR | 10-2016-0021325 A | 2/2016 |
| KR | 10-2016-0146349 A | 12/2016 |
| KR | 10-2019-0023917 A | 3/2019 |
| WO | WO 2013/006796 A1 | 1/2013 |
| WO | WO 2019/117485 A1 | 6/2019 |
| WO | WO 2020/203646 A1 | 10/2020 |

OTHER PUBLICATIONS

EPO Extended European Search Report dated Mar. 5, 2021, issued in corresponding European Patent Application No. 20194589.6 (9 pages).

European Patent Office Extended Search Report, for Patent Application No. 20194573.0, dated Feb. 12, 2021, 9 pages.

European Patent Office Extended Search Report, for Patent Application No. 20194592.0, dated Feb. 8, 2021, 9 pages.

European Patent Office Extended Search Report, for Patent Application No. 20194611.8, dated Feb. 16, 2021, 9 pages.

European Patent Office Extended Search Report, for Patent Application No. 20194607.6, dated Feb. 8, 2021, 10 pages.

European Patent Office Extended Search Report, for Patent Application No. 20194594.6, dated Feb. 10, 2021, 9 pages.

European Patent Office Extended Search Report, for Patent Application No. 20194587.0, dated Feb. 16, 2021, 10 pages.

(56) References Cited

OTHER PUBLICATIONS

U.S. Notice of Allowance from U.S. Appl. No. 16/901,547, dated Jul. 23, 2021, 8 pages.
U.S. Office Action from U.S. Appl. No. 16/844,914, dated Aug. 19, 2021, 18 pages.
U.S. Office Action from U.S. Appl. No. 16/844,914, dated Nov. 9, 2021, 18 pages.
U.S. Office Action from U.S. Appl. No. 16/901,474, dated Oct. 20, 2021, 21 pages.
U.S. Office Action from U.S. Appl. No. 16/901,522, dated Dec. 13, 2021, 40 pages.
U.S. Office Action from U.S. Appl. No. 16/901,541, dated Dec. 8, 2021, 32 pages.
U.S. Office Action from U.S. Appl. No. 17/014,034, dated Dec. 13, 2021, 40 pages.
U.S. Office Action from U.S. Appl. No. 17/014,061, dated Feb. 15, 2022, 20 pages.
U.S. Office Action from U.S. Appl. No. 17/014,853, dated Dec. 13, 2021, 39 pages.
U.S. Office Action from U.S. Appl. No. 17/014,900, dated Dec. 10, 2021, 21 pages.
U.S. Office Action from U.S. Appl. No. 17/014,970, dated Mar. 2, 2022, 38 pages.
U.S. Office Action from U.S. Appl. No. 17/014,976, dated Dec. 22, 2021, 24 pages.
U.S. Restriction Requirement from U.S. Appl. No. 16/844,914, dated May 12, 2021, 6 pages.
U.S. Restriction Requirement from U.S. Appl. No. 17/014,970, dated Oct. 22, 2021, 6 pages.
Advisory Action for U.S. Appl. No. 16/901,474 dated Jul. 7, 2022, 4 pages.
Final Office Action for U.S. Appl. No. 17/014,970 dated Jun. 24, 2022, 38 pages.
Chinese Office Action for CN Application No. 202010920922.X dated Jul. 6, 2022, 13 pages.
Chinese Office Action for CN Application No. 202010921351.1 dated Jul. 5, 2022, 9 pages.
Final Office Action for U.S. Appl. No. 16/844,914 dated Jul. 20, 2022, 8 pages.
Final Office Action for U.S. Appl. No. 17/014,061 dated Jul. 18, 2022, 16 pages.
Notice of Allowance for U.S. Appl. No. 16/901,541 dated Jul. 27, 2022, 8 pages.
Advisory Action for U.S. Appl. No. 17/014,970 dated Sep. 9, 2022, 3 pages.
Notice of Allowance for U.S. Appl. No. 16/844,914 dated Sep. 28, 2022, 7 pages.
Notice of Allowance for U.S. Appl. No. 17/014,976 dated Aug. 16, 2022, 9 pages.
Notice of Allowance for U.S. Appl. No. 17/014,900 dated Aug. 30, 2022, 8 pages.
Office Action for U.S. Appl. No. 16/901,474 dated Aug. 17, 2022, 22 pages.
Advisory Action for U.S. Appl. No. 17/014,061 dated Oct. 21, 2022, 7 pages.
Chinese Office Action for CN Application No. 202010921939.7 dated Aug. 1, 2022, 9 pages.
Final Office Action for U.S. Appl. No. 16/901,527 dated Oct. 4, 2022, 22 pages.
Notice of Allowance for U.S. Appl. No. 17/014,976 dated Oct. 19, 2022, 8 pages.
Office Action for U.S. Appl. No. 16/901,522 dated Oct. 4, 2022, 15 pages.
Office Action for U.S. Appl. No. 17/014,034 dated Oct. 4, 2022, 15 pages.
Office Action for U.S. Appl. No. 17/014,853 dated Oct. 4, 2022, 25 pages.
Office Action for U.S. Appl. No. 17/014,970 dated Oct. 5, 2022, 38 pages.
Advisory Action for U.S. Appl. No. 16/844,914 dated Jan. 20, 2022, 4 pages.
Collins Online Dictionary entry for "space", accessed at https://www.collinsdictionary.com/us/dictionary/english/space on May 18, 2022, 1 page.
Final Office Action for U.S. Appl. No. 16/901,474 dated Apr. 25, 2022, 37 pages.
Final Office Action for U.S. Appl. No. 16/901,522 dated May 27, 2022, 24 pages.
Final Office Action for U.S. Appl. No. 16/901,541 dated Mar. 22, 2022, 17 pages.
Final Office Action for U.S. Appl. No. 17/014,034 dated May 25, 2022, 38 pages.
Final Office Action for U.S. Appl. No. 17/014,853 dated May 31, 2022, 24 pages.
Final Office Action for U.S. Appl. No. 17/014,976 dated Jun. 7, 2022, 24 pages.
Google define feature utilizing Oxford Languages Dictionary for "space", accessed at google.com, May 18, 2022, 1 page.
Notice of Allowance for U.S. Appl. No. 16/901,541 dated Jun. 1, 2022, 8 pages.
Notice of Allowance for U.S. Appl. No. 16/901,547 dated Jul. 23, 2021, 8 pages.
Office Action for U.S. Appl. No. 16/844,914 dated Mar. 17, 2022, 24 pages.
Office Action for U.S. Appl. No. 16/901,527 dated, Apr. 11, 2022, 24 pages.
Office Action for U.S. Appl. No. 17/014,900 dated Mar. 28, 2022, 8 pages.
PubChem Compound Summary for Vermiculite, accessed at https://pubchem.ncbi.nlm.nih.gov/compound/156593754, Apr. 5, 2022, 21 pages.
Notice of Allowance for U.S. Appl. No. 16/844,914 dated Dec. 8, 2022, 8 pages.
Notice of Allowance for U.S. Appl. No. 16/901,474 dated Dec. 13, 2022, 10 pages.
Notice of Allowance for U.S. Appl. No. 16/901,541 dated Dec. 14, 2022, 8 pages.
Notice of Allowance for U.S. Appl. No. 17/014,034 dated Jan. 27, 2023, 7 pages.
Notice of Allowance for U.S. Appl. No. 17/014,900 dated Feb. 13, 2023, 8 pages.
Notice of Allowance for U.S. Appl. No. 17/014,976 dated Dec. 7, 2022, 8 pages.
Office Action for U.S. Appl. No. 17/014,089 dated Dec. 9, 2022, 8 pages.
U.S. Final Office Action dated Apr. 13, 2023, issued in U.S. Appl. No. 17/014,970 (43 pages).
U.S. Office Action dated Feb. 24, 2023, issued in U.S. Appl. No. 16/901,527 (26 pages).
U.S. Notice of Allowance dated Mar. 7, 2023, issued in U.S. Appl. No. 17/014,089 (11 pages).
U.S. Final Office Action dated Mar. 13, 2023, issued in U.S. Appl. No. 16/901,522 (13 pages).
U.S. Final Office Action dated Mar. 13, 2023, issued in U.S. Appl. No. 17/014,853 (21 pages).
U.S. Office Action dated Mar. 15, 2023, issued in U.S. Appl. No. 17/014,061 (16 pages).
U.S. Office Action dated Jun. 30, 2023, issued in U.S. Appl. No. 17/014,853 (31 pages).

* cited by examiner

ENERGY STORAGE MODULE INCLUDING INSULATION SPACERS AND AN EXTINGUISHER SHEET

CROSS-REFERENCE TO RELATED APPLICATION

This application claims priority to and the benefit of Korean Patent Application No. 10-2019-0110365, filed on Sep. 5, 2019 in the Korean Intellectual Property Office, the entire content of which is herein incorporated by reference.

BACKGROUND

1. Field

Aspects of embodiments of the present disclosure relate to an energy storage module.

2. Description of the Related Art

An energy storage module may be linked with a renewal energy and power system, such as, for example, a solar cell, to store electric power when demand for the electric power from a load is low, and to use (or discharge or provide) the stored electric power when demand for the electric power is high. The energy storage module generally includes (or is) an apparatus including a large quantity of battery cells (e.g., secondary batteries or secondary battery cells).

The battery cells are generally received (or accommodated) in multiple trays, which are received in a rack, and multiple racks may be received in a container box.

Recently, there have been many cases in which fires occur to energy storage modules. Once a fire occurs to the energy storage module, it is not easy to extinguish the fire due to characteristics of the energy storage module. An energy storage module, including a plurality of battery cells, generally demonstrates high-capacity, high-output characteristics, and research into technology for increasing the safety of the energy storage module is being actively conducted.

SUMMARY

According to an aspect of embodiments of the present disclosure, an energy storage module is capable of improving safety. According to another aspect of embodiments of the present disclosure an energy storage module exhibits a reduced fire risk and increased safety by reducing or minimizing the chance of a fire spreading to adjacent battery cells when a fire occurs.

According to one or more embodiments of the present disclosure, an energy storage module comprises: a plurality of battery cells arranged in a length direction such that long side surfaces of adjacent ones of the battery cells face one another, each of the battery cells comprising a vent; a plurality of insulation spacers, at least one of the insulation spacers being located between the long side surfaces of each adjacent pair of the battery cells; a cover member including an internal receiving space configured to accommodate the battery cells and the insulation spacers; a top plate coupled to a top portion of the cover member and including ducts respectively corresponding to the vents of the battery cells positioned to correspond to vents of the battery cells, and opening holes respectively corresponding to the insulation spacers; a top cover coupled to a top portion of the top plate and including discharge holes respectively corresponding to the ducts; and an extinguisher sheet located between the top cover and the top plate, configured to emit a fire extinguishing agent at a temperature exceeding a certain temperature, and including opening holes positioned to correspond to the ducts, wherein the insulation spacers include a heat-insulating first sheet and a plurality of flame-retardant second sheets respectively adhered to opposite surfaces of the first sheet by an adhesion member.

In an embodiment, the first sheet comprises ceramic paper, and the second sheets comprise mica paper.

In an embodiment, the first sheet comprises a ceramic fiber comprising an alkaline earth metal.

In an embodiment, the long side surfaces of adjacent ones of the battery cells, which face each other, are spaced apart from each other by a first distance, and a thickness of each of the insulation spacers is less than 50% of the first distance.

In an embodiment, the fire extinguishing agent emitted from the extinguisher sheet is applied to spaces between the insulation spacers and the battery cells through the opening holes of the extinguisher sheet to be brought into contact with the long side surfaces of the battery cells.

In an embodiment, each of the insulation spacers has a width-direction size less than twice a height-direction size thereof, and the first sheet is adhered to the second sheets at opposite ends thereof by the adhesion member.

In an embodiment, each of the insulation spacers further comprises an edge part comprising a plastic material, and the edge part is formed at peripheral edges of a sheet part by insert molding to cover the peripheral edges of the sheet part.

In an embodiment, the first sheet and the second sheets are spaced apart from each other at central portions thereof to define air passages.

In an embodiment, a width-direction size of the insulation spacers is greater than twice a height-direction size thereof, and the first sheet and the second sheets respectively have a region adhered to each other from top and bottom ends thereof by the adhesion member.

In an embodiment, the extinguisher sheet includes a receiving space receiving the fire extinguishing agent within an external case made of polyurea and polyurethane.

In an embodiment, the receiving space includes one or more capsules or tubes.

In an embodiment, the fire extinguishing agent comprises halogen carbon.

In an embodiment, the extinguisher sheet comprises a plurality of sheets respectively configured to emit the fire extinguishing agent at different temperatures.

In an embodiment, a ratio of the fire extinguishing agent in the extinguisher sheet to a total weight of the extinguisher sheet is in a range from 30% to 50%.

In an embodiment, an amount of the fire extinguishing agent in the extinguisher sheet is in a range from 0.12 g/cm$^3$ to 0.82 g/cm$^3$.

As described above, the energy storage module according to embodiments of the present disclosure can primarily suppress ignition by providing a shut-down function to a battery cell using compositions of negative and positive electrode active materials and can prevent or reduce heat from spreading to adjacent cells by rapidly extinguishing and cooling a battery cell when a vent of the battery cell opens (or ruptures) or when a fire occurs.

DETAILED DESCRIPTION

Figure 1:
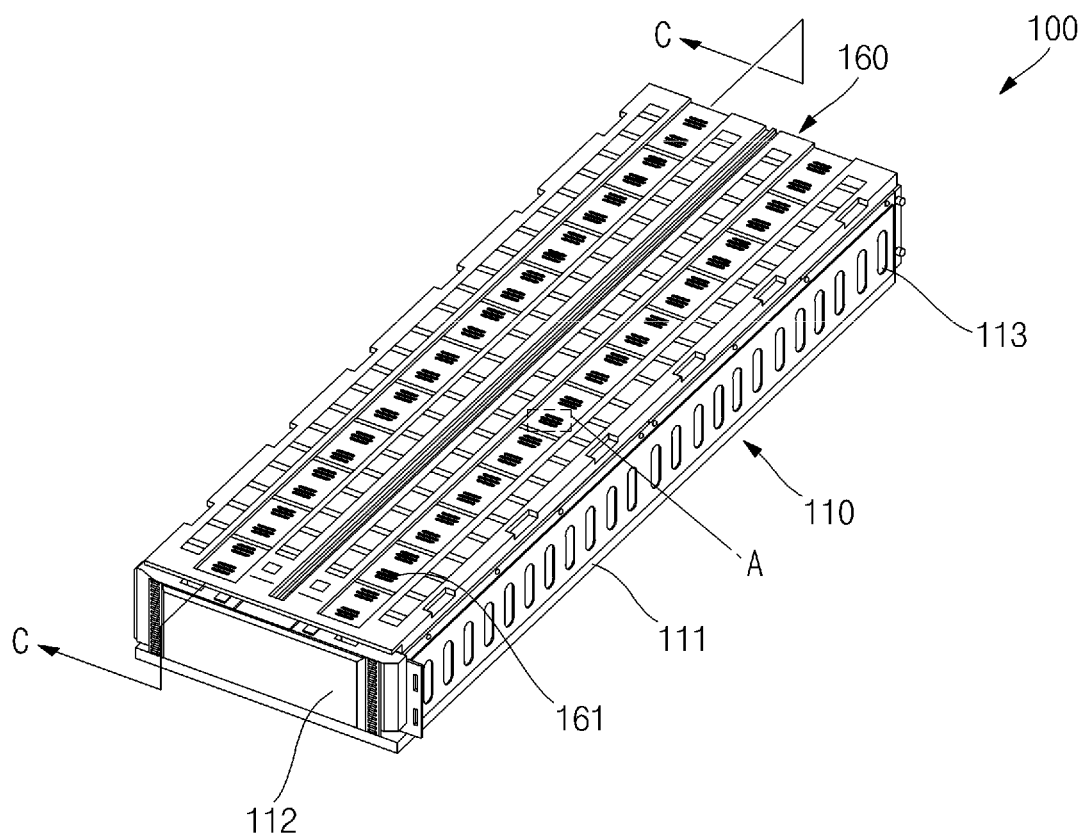
FIG. 1 is a perspective view of an energy storage module according to an embodiment of the present disclosure.

Herein, some example embodiments of the present disclosure will be described in further detail. The subject matter of the present disclosure, however, may be embodied in many different forms and should not be construed as being limited to the example embodiments set forth herein. Rather, these example embodiments are provided so that this disclosure will be thorough and complete and will convey the aspects and features of the present disclosure to those skilled in the art.

In addition, in the accompanying drawings, sizes or thicknesses of various components may be exaggerated for brevity and clarity. Like numbers refer to like elements throughout. As used herein, the term "and/or" includes any and all combinations of one or more of the associated listed items. In addition, it is to be understood that when an element A is referred to as being "connected to" an element B, the element A may be directly connected to the element B or one or more intervening elements C may be present therebetween such that the element A and the element B may be indirectly connected to each other.

The terminology used herein is for the purpose of describing particular embodiments and is not intended to be limiting of the disclosure. As used herein, the singular forms are intended to include the plural forms as well, unless the context clearly indicates otherwise. It is to be further understood that the terms "comprise" and/or "comprising," when used in this specification, specify the presence of stated features, numbers, steps, operations, elements, and/or components, but do not preclude the presence or addition of one or more other features, numbers, steps, operations, elements, components, and/or groups thereof.

It is to be understood that, although the terms "first," "second," etc. may be used herein to describe various members, elements, regions, layers, and/or sections, these members, elements, regions, layers, and/or sections should not be limited by these terms. These terms are used to distinguish one member, element, region, layer, and/or section from another. Thus, for example, a first member, a first element, a first region, a first layer, and/or a first section discussed below could be termed a second member, a second element, a second region, a second layer, and/or a second section without departing from the teachings of the present disclosure.

Spatially relative terms, such as "beneath," "below," "lower," "above," "upper," and the like, may be used herein for ease of description to describe one element or feature's relationship to another element(s) or feature(s) as illustrated in the figures. It is to be understood that the spatially relative terms are intended to encompass different orientations of the device in use or operation in addition to the orientation depicted in the figures. For example, if the device in the figures is turned over, elements described as "below" or "beneath" other elements or features would then be oriented "on" or "above" the other elements or features. Thus, the exemplary term "below" can encompass both an orientation of above and below.

Unless otherwise defined, all terms (including technical and scientific terms) used herein have the same meaning as commonly understood by one of ordinary skill in the art to which this disclosure belongs. It is to be further understood that terms, such as those defined in commonly used dictionaries, should be interpreted as having a meaning that is consistent with their meaning in the context of the relevant art and are not to be interpreted in an idealized or overly formal sense unless expressly so defined herein.

Herein, a configuration of an energy storage module according to some example embodiments of the present disclosure will be described.

Figure 2:
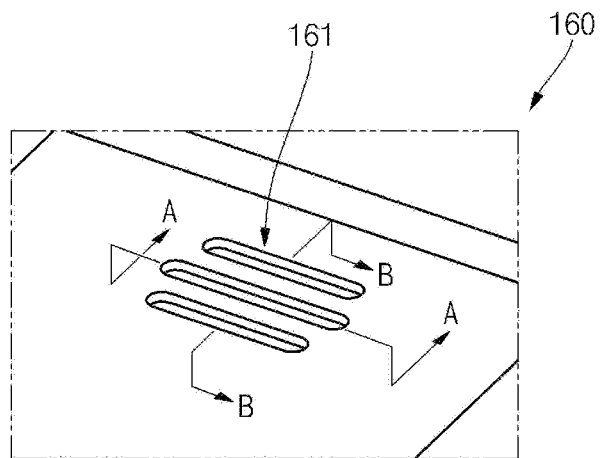
FIG. 2 is an enlarged view of a region "A" of FIG. 1.
Figure 3:
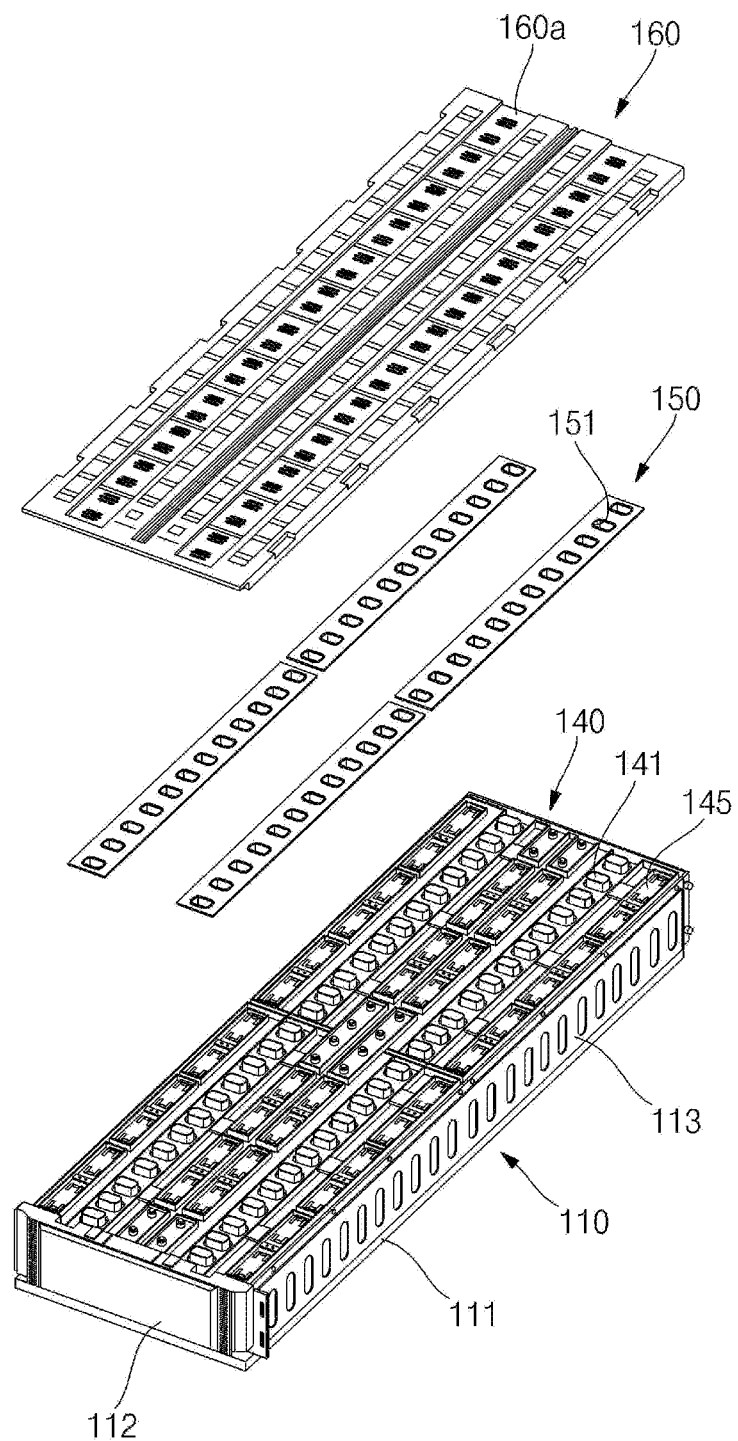
FIG. 3 is an exploded perspective view of the energy storage module shown in FIGS. 1 and 2.
Figure 4:
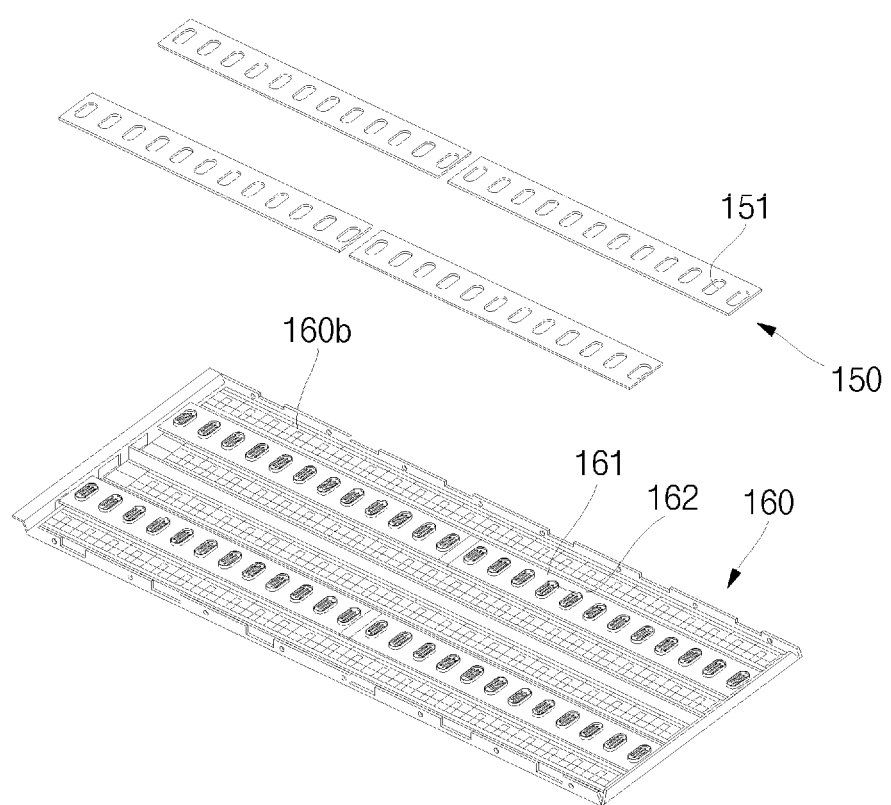
FIG. 4 is an exploded bottom perspective view of an extinguisher sheet coupled to a top cover in the energy storage module shown in FIGS. 1 to 3.
Figure 5:
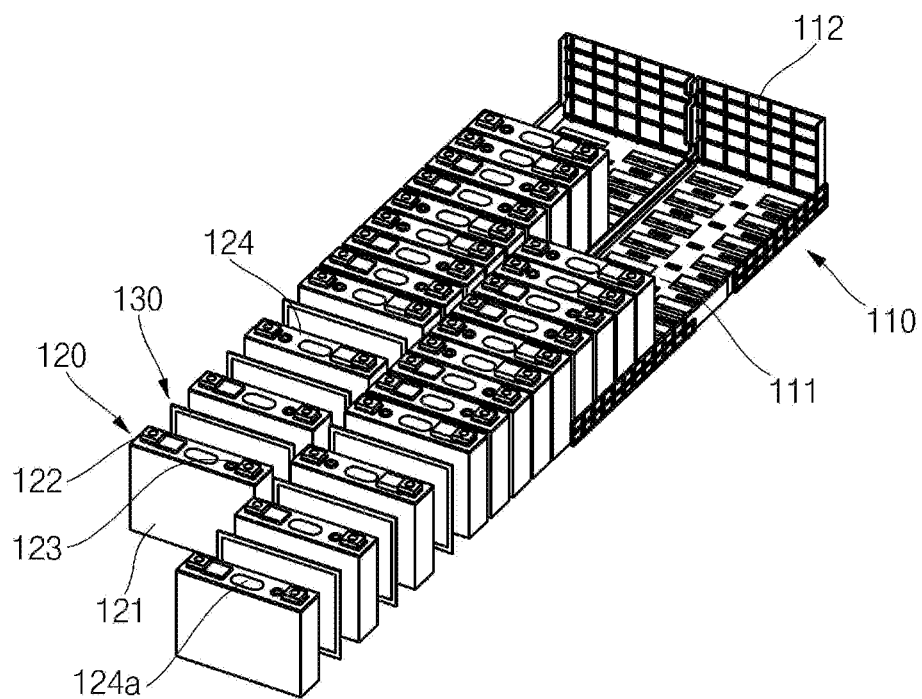
FIG. 5 is a perspective view illustrating battery cells and insulation spacers arranged on a bottom plate in the energy storage module shown in FIGS. 1 to 4.

FIG. 1 is a perspective view of an energy storage module according to an embodiment of the present disclosure; FIG. 2 is an enlarged view of a region "A" of FIG. 1; FIG. 3 is an exploded perspective view of the energy storage module shown in FIGS. 1 and 2; FIG. 4 is an exploded bottom perspective view of an extinguisher sheet coupled to a top cover in the energy storage module shown in FIGS. 1 to 3; and FIG. 5 is a perspective view illustrating battery cells and insulation spacers arranged on a bottom plate in the energy storage module shown in FIGS. 1 to 4.

Referring to FIGS. 1 to 5, an energy storage module 100 according to an embodiment of the present disclosure may include a cover member 110, battery cells 120, insulation spacers 130, a top plate 140, an extinguisher sheet 150, and a top cover 160.

The cover member 110 may provide an internal space for receiving (or accommodating) the battery cells 120 and the insulation spacers 130. The cover member 110 includes a bottom plate 111, an end plate 112, and a side plate 113, which together form a space for arranging the battery cells 120 and the insulation spacers 130. In addition, the cover member 110 may fix positions of the battery cells 120 and the insulation spacers 130 and may protect the battery cells 120 from external impacts.

The battery cells 120 may be alternately arranged on a top surface of the bottom plate 111 of the cover member 110 with the insulation spacers 130 (e.g., with the insulation spacers 130 arranged between adjacent ones of the battery cells 120). For example, the battery cells 120 may be arranged in a plurality of columns (e.g., two columns) along the top surface of the bottom plate 111 such that long side surfaces of the battery cells 120 face each other, and the insulation spacers 130 may be positioned between adjacent ones of the long side surfaces of the battery cells 120.

Each of the battery cells 120 includes an electrode assembly accommodated in a case 121. The electrode assembly may be configured by winding, stacking, or laminating a positive electrode plate and a negative electrode plate, each having a portion coated with an active material (e.g., a coating or coated portion), in a state in which a separator is positioned between the positive electrode plate and the negative electrode plate. A top portion of the case 121 may be sealed by a cap plate 124. In an embodiment, a vent 124a is located at approximately a center of the cap plate 124 and has a smaller thickness than other regions of the cap plate 124. In addition, electrode terminals 122 and 123, which are electrically connected to uncoated regions (e.g., uncoated portions) of the positive and negative electrode plates, may be exposed at an upper portion of the case 121 through the cap plate 124. The electrode terminals 122 and 123 may be referred to as a first electrode terminal 122 and a second electrode terminal 123, respectively, defining, for example, a negative electrode terminal and a positive electrode terminal, but the polarities thereof may be reversed. Occurrences of ignition of the battery cells 120 can be reduced by using particular compositions of active materials of the battery cells 120, thereby increasing safety. Such active material compositions will be described in further detail below.

The insulation spacers 130 may be positioned between each of (e.g., between adjacent ones of) the battery cells 120 to prevent or substantially prevent the battery cells 120 from contacting one another, thereby maintaining the battery cells 120 (e.g., the cases 121 of the battery cells 120) in an electrically isolated state. In addition, a reference distance or space (e.g., a predetermined distance) is maintained between each of the insulation spacers 130 and the battery cells 120 to establish external air passages (e.g., fire extinguishing agent passages), thereby allowing for cooling of the battery cells 120. The insulation spacers 130 may include a flame-retardant (or non-combustible) sheet that prevents (or substantially impedes) a fire from spreading to neighboring battery cells 120 and a heat-insulating sheet that prevents (or substantially impedes) heat from propagating to neighboring battery cells 120 when a fire starts in any of the battery cells 120. Configurations of the insulation spacers 130 will be described in further detail below.

The top plate 140 may be coupled to a top portion (e.g., a top surface or a top) of the cover member 110. The top plate 140 may be coupled to the cover member 110 while covering top portions (e.g., top surfaces) of the battery cells 120. In addition, the positive electrode terminals 123 and negative electrode terminals 122 of the battery cells 120 are exposed to (or through) the top plate 140, and bus bars 145 may be coupled to the respective terminals 122 and 123, thereby connecting the battery cells 120 to one another in series, in parallel, or in series/parallel.

The top plate 140 includes a plurality of ducts 141 located to respectively correspond to the vents 124a, which are located on the top surface of each of the battery cells 120. The ducts 141 may be arranged along a direction, for example, in a length direction of the top plate 140. Accordingly, the gas discharged from the vent 124a of one of the battery cells 120 may move upwardly along a corresponding one of the ducts 141 of the top plate 140. The configuration and operation of the ducts 141 will be described in further detail below.

The extinguisher sheet 150 is positioned between the top plate 140 and the top cover 160. The extinguisher sheet 150 may be provided as one or more members (or sheets) extending along a direction, for example, in the length direction of the top plate 140. In addition, the extinguisher sheet 150 may include openings (e.g., opening holes) positioned to respectively correspond to the ducts 141 of the top plate 140. Accordingly, the extinguisher sheet 150 may be positioned such that the openings therein are respectively aligned with the ducts 141 of the top plate 140. In addition, the extinguisher sheet 150 may be coupled to a bottom surface 160b of the top cover 160. Because the extinguisher sheet 150 is coupled to the bottom surface 160b of the top cover 160, the extinguisher sheet 150 may be positioned above the top plate 140. The configuration and operation of the extinguisher sheet 150 will be described below in further detail.

The top cover 160 is coupled to the top portion of the top plate 140. The top cover 160 may cover the top plate 140 and the bus bar 145. The top cover 160 also covers the extinguisher sheet 150, which is coupled to the bottom surface 160b of the top cover 160, thereby protecting the top plate 140, the bus bar 145, and the extinguisher sheet 150 from external impacts applied to a top surface 160a of the top cover 160. In addition, the top cover 160 may include discharge openings (e.g., discharge holes) 161. In addition, the top cover 160 may include protrusion parts (e.g., protrusions) 162 spaced by a distance (e.g., a predetermined distance) apart from the outer periphery of (e.g., may extend around a periphery of) respective ones of the discharge holes 161, and the protrusion parts 162 downwardly protrude from the top cover 160. Openings (e.g., opening holes) 151 of the extinguisher sheet 150 may be coupled to (e.g., may extend around) the exteriors of the respective ones of the protrusion parts 162, and the ducts 141 may be coupled to (e.g., may extend into) the interior of the respective ones of the protrusion parts 162. The discharge holes 161 may each include a plurality of discharge holes (e.g., discharge sub-holes) arranged along a direction, for example, in a length direction, of the top cover 160. In addition, the discharge holes 161 may be positioned to respectively correspond to the ducts 141 of the top plate 140. In addition, the discharge holes 161 may each be provided as a plurality of openings passing through the top and bottom surfaces of the top plate 140 and spaced apart from one another. Accordingly, the gases discharged from the vent 124a of the battery cell 120 when the vent 124a ruptures may be discharged to the exterior through the corresponding duct 141 of the top plate 140 and the corresponding discharge opening 161 of the top cover 160 and may facilitate user safety by preventing a user's hand from contacting the internal structure of the top cover 160.

Herein, the ducts 141 of the top plate 140 in the energy storage module 100 according to an embodiment of the present disclosure will be described in further detail.

Figure 6:
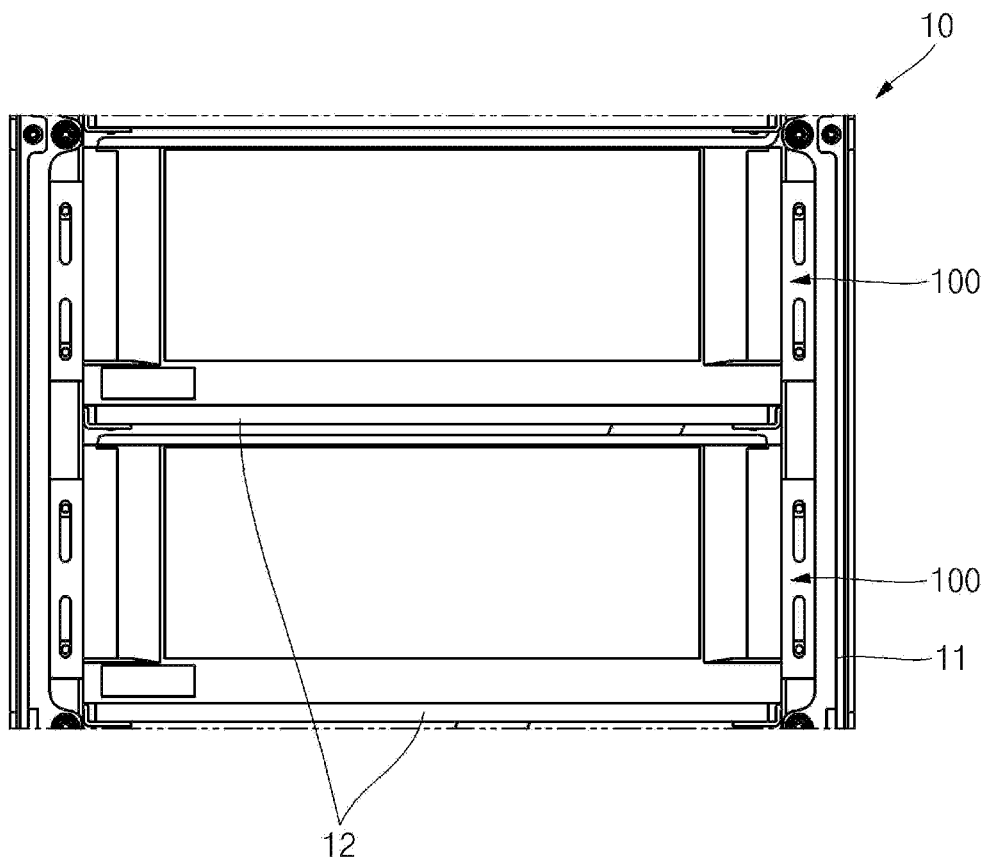
FIG. 6 illustrates a rack on which a plurality of energy storage modules is coupled according to an embodiment of the present disclosure.
Figure 7A:
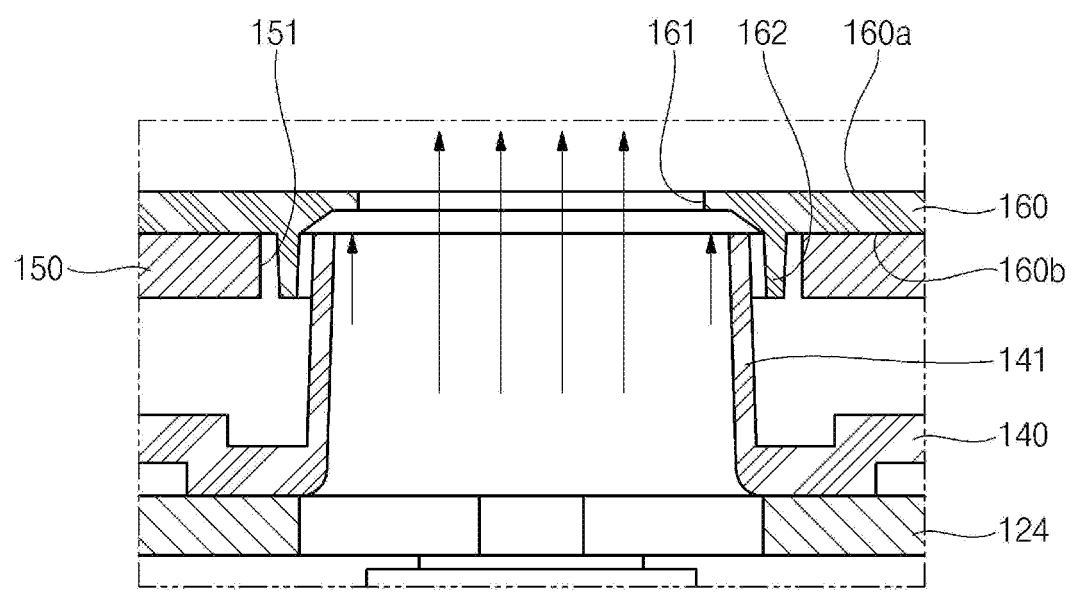
FIGS. 7A and 7B illustrate internal gas movement from a battery cell through a duct in the energy storage module shown in FIGS. 1 to 4.
Figure 7B:
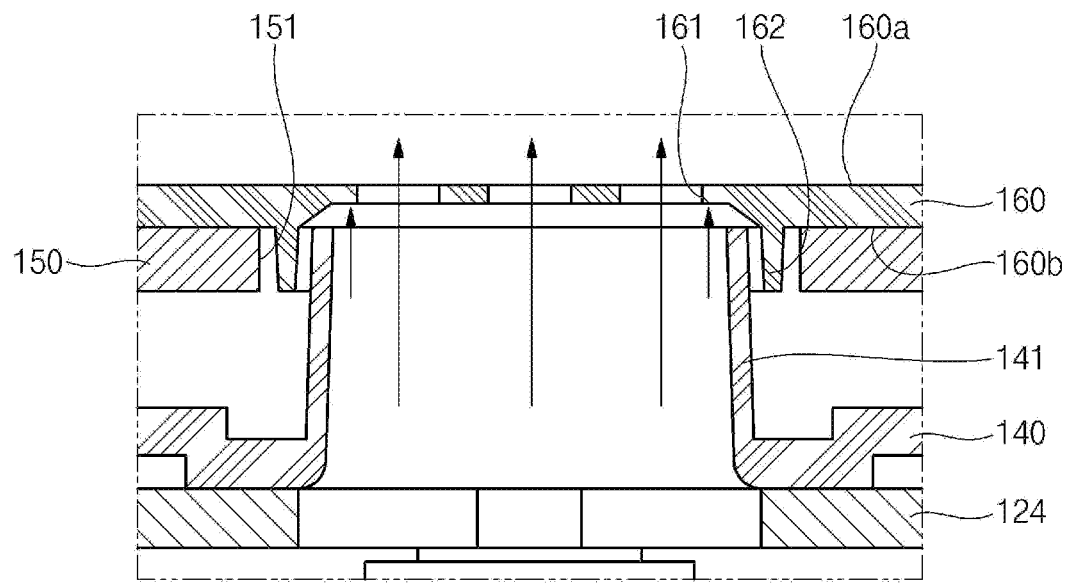

FIG. 6 illustrates a rack on which a plurality of energy storage modules 100 is coupled according to an embodiment of the present disclosure; and FIGS. 7A and 7B illustrate internal gas movement from a battery cell 120 through a duct 141 in the energy storage module 100 shown in FIGS. 1 to 4. Here, FIG. 7A illustrates an enlarged cross-sectional view taken along the line A-A of FIG. 2, and FIG. 7B illustrates an enlarged cross-sectional view taken along the line B-B of FIG. 2.

Referring to FIG. 6, a rack 10 includes a plurality of shelves 12 and a plurality of the energy storage modules 100 accommodated on the shelves 12. The number of energy storage modules 100 may vary according to the desired capacity, and the energy storage modules 100 may be mounted in the rack 10 and then fixed thereto. The rack 10 may include a frame 11 defining an overall external shape of the rack 10 and shelves 12 at different levels of the frame 11 to support bottom portions (e.g., bottom surfaces) of the energy storage modules 100. Here, a bottom surface of one of the energy storage modules 100 may contact a top surface of a first shelf 12, and a bottom surface of another one of the energy storage modules 100 may be positioned on a top surface of a second shelf 12 while being spaced a distance apart from the top surface of the first shelf 12. In FIG. 6, two shelves 12 are shown in the frame 11 with energy storage modules 100 respectively mounted on the shelves 12, but the present disclosure is not limited to the number of the shelves 12 shown in the drawing.

In addition, as described above, the ducts 141 located on the top plate 140 respectively correspond to the vents 124a of the battery cells 120. Referring to FIGS. 7A and 7B, the gas discharged from one of the vents 124a may move upwardly along the duct 141, as indicated by the arrows. In addition, if the vent 124a of a battery cell 120 ruptures, the gas may be discharged to the exterior through the discharge hole 161 of the top cover 160 positioned above the duct 141. In some embodiments, a shelf 12 of the rack 10, which supports another energy storage module 100, is positioned over the top surface 160a of the top cover 160 such that the gas may accumulate between the top surface 160a of the top cover 160 and the adjacent shelf 12. In an embodiment, a distance between the top surface 160a of the top cover 160 and the adjacent shelf 12 may be in a range from about 3 mm to about 7 mm. When the distance is greater than or equal to about 3 mm, heat generated from the energy storage module 100 can be easily discharged to the exterior. When the distance is less than or equal to about 7 mm, a high-temperature inert gas atmosphere can be easily created, which will be further described below.

When the vent 124a of the battery cell 120 ruptures, electrolyte vapor component gas having a relatively low temperature of about 170° C. is primarily generated at an initial stage, and inert gas having a relatively high temperature of about 400° C. may be gradually generated at later stages (e.g., at a later time). In addition, when the gas having the relatively low temperature is emitted, heat-resistant plastic materials constituting the top plate 140 and the top cover 160 may be maintained without being melted. But if the separator melts due to a further increase in the internal temperature of the battery cell 120, high-temperature inert gas may be generated with flames. As described above, the inert gas may fill a space between the top surface 160a of the top cover 160 and the adjacent shelf 12 to create an inert gas atmosphere, thereby preventing or substantially preventing oxygen induction.

The inert gas can prevent or substantially prevent flames generated by the battery cell 120 from spreading to neighboring battery cells 120 or to another energy storage module 100. In addition, the extinguisher sheet 150, which is positioned under the top cover 160, may operate (e.g., may emit or spray a fire extinguishing agent) in response to the high-temperature inert gas, which will be described in further detail below.

Herein, a configuration and operation of the extinguisher sheet 150 of the energy storage module 100 according to an embodiment of the present disclosure will be described.

Figure 8:
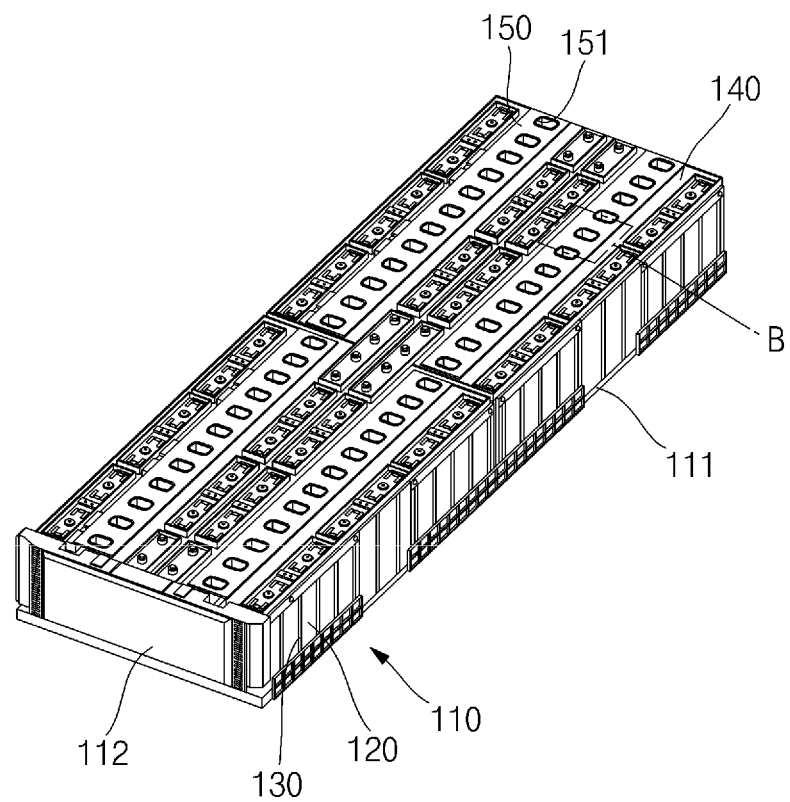
FIG. 8 is a perspective view of the extinguisher sheet coupled to the top plate in the energy storage module shown in FIGS. 1 to 4.
Figure 9:
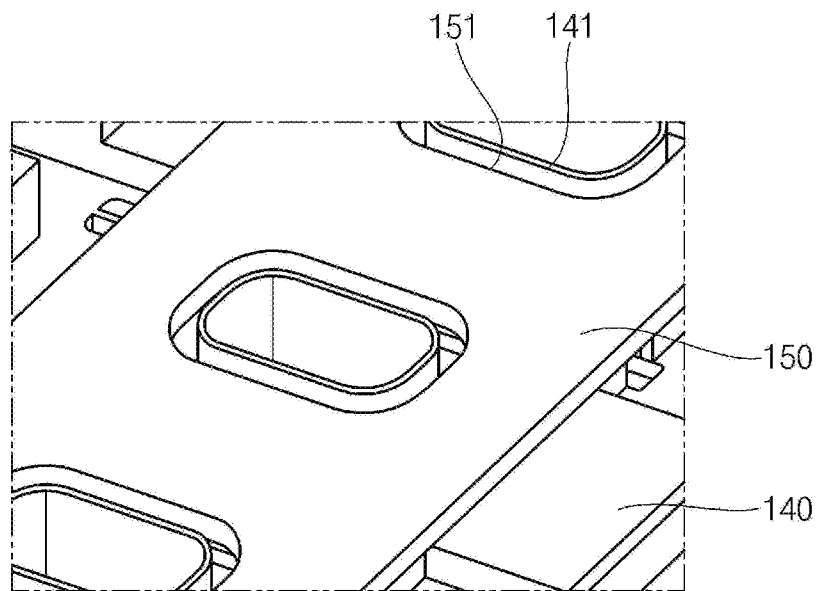
FIG. 9 is an enlarged view of a region "B" of FIG. 8.
Figure 10A:
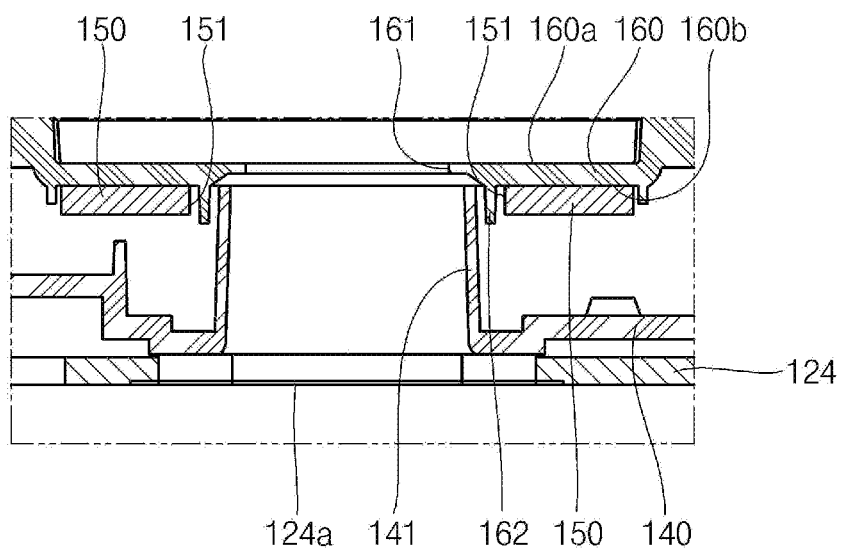
FIGS. 10A and 10B are conceptual diagrams illustrating a state in which an extinguisher sheet operates in the energy storage module according to an embodiment of the present disclosure.
Figure 10B:
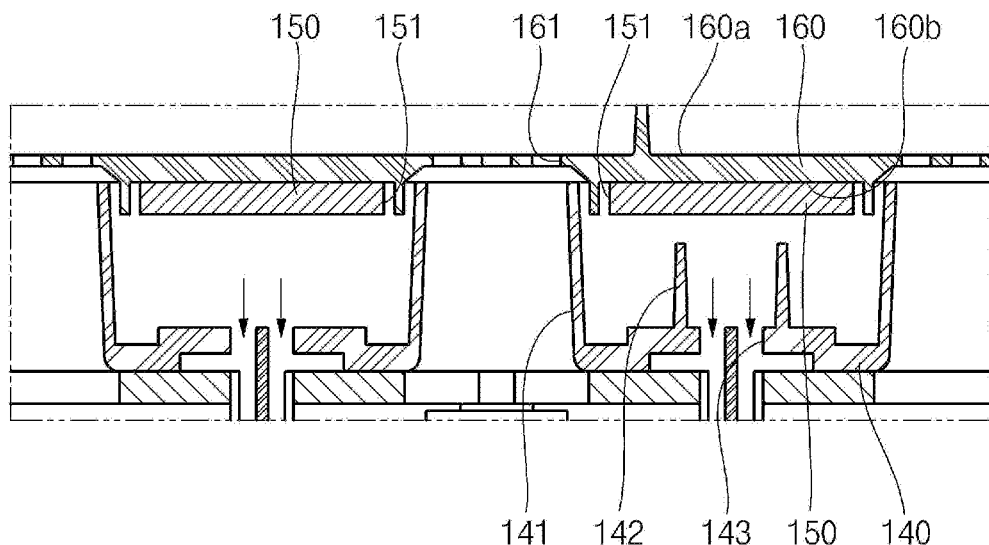

FIG. 8 is a perspective view illustrating the extinguisher sheet 150 coupled to the top plate 140 in the energy storage module 100 according to an embodiment of the present disclosure; and FIG. 9 is an enlarged view of a region "B" of FIG. 8. FIGS. 10A and 10B are conceptual diagrams illustrating the operation of the extinguisher sheet 150 in the energy storage module 100 according to an embodiment of the present disclosure. FIGS. 11A to 11D are views illustrating example extinguisher sheets in the energy storage module according to an embodiment of the present disclosure.

Referring to FIGS. 8 and 9, the extinguisher sheet 150 may be positioned between the top plate 140 and the top cover 160, as described above. As shown in FIG. 9, the extinguisher sheet 150 may have opening holes 151 coupled to the ducts 141 of the top plate 140. Accordingly, movement of the gases through the ducts 141 may not be influenced by the extinguisher sheet 150.

In addition, referring to FIGS. 10A and 10B, the extinguisher sheet 150 may operate (e.g., may emit the fire extinguishing agent) in response to heat when the inert gas having a relatively high temperature of, for example, about 400° C., is generated. The fire extinguishing agent contained in the extinguisher sheet 150 is emitted by (e.g., is sprayed from) the extinguisher sheet 150 in response to the high-temperature gas. In addition, because a top portion of the extinguisher sheet 150 is covered by the top cover 160, the fire extinguishing agent may be directionally emitted (or sprayed) toward the bottom surface 160b of the top cover 160. In addition, the fire extinguishing agent may reach the underlying insulation spacers 130 through openings (e.g., fire extinguishing agent openings or opening holes) 143 located between adjacent ones of the ducts 141 of the top plate 140. In addition, a fluid guide protrusion 142 may further be provided around the openings 143 in the duct 141, thereby efficiently guiding the movement of the fire extinguishing agent toward the insulation spacers 130. As will be further described below, after reaching the insulation spacers 130, the fire extinguishing agent may move along surfaces of the insulation spacers 130, thereby extinguishing a fire on a battery cell 120 and cooling the battery cell 120.

Figure 11A:
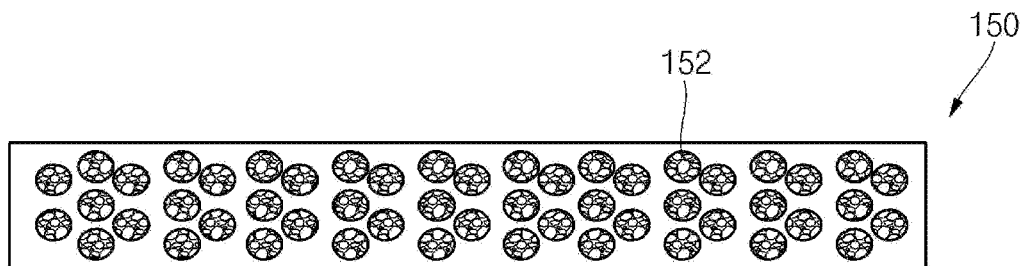
FIGS. 11A to 11D are views illustrating example configurations of extinguisher sheets in the energy storage module according to an embodiment of the present disclosure.

The extinguisher sheet 150 may include any of various example types of extinguisher sheets, as shown in FIGS. 11A to 11D. For example, as shown in FIG. 11A, the extinguisher sheet 150 may include receiving parts 152 for receiving (e.g., accommodating or storing) a fire extinguishing agent within an external case made of polyurea and polyurethane. The receiving space 152 may include a micro-sized fire extinguishing capsule(s) covering (or encapsulating) the fire extinguishing agent therein. The fire extinguishing agent may include, for example, halogenated carbon, such as a halogenated ketone. In an embodiment, as described above, the fire extinguishing capsules forming the receiving parts 152 of the extinguisher sheet 150 may open (or rupture) to emit the internal fire extinguishing agent when the gas passing through the duct 141 of the top plate 140 reaches a certain temperature (e.g., a relatively high temperature of about 400° C.). In further detail, phase transformation of the fire extinguishing agent may start at about 50° C., and the fire extinguishing capsules may open due to the pressure applied during the phase transformation in a high temperature atmosphere of about 400° C., such that the internal fire extinguishing agent encapsulated within the fire extinguishing capsules is emitted. In an embodiment, the fire extinguishing capsules may be melted at the high temperature of about 400° C. to then emit the encapsulated fire extinguishing agent.

In an embodiment, a ratio of the fire extinguishing agent received in the extinguisher sheet 150 to a total weight of the extinguisher sheet 150 may be in a range from 30% to 50%. When the ratio of the fire extinguishing agent is greater than or equal to 30%, a fire on the battery cell 120 can be appropriately extinguished during the operation of the extinguisher sheet 150. When the ratio of the fire extinguishing agent is less than or equal to 50%, the extinguisher sheet 150 may be easily set to operate (e.g., rupture) at about 400° C.

In an embodiment, an amount of the fire extinguishing agent may be in a range from 0.12 g/cm$^3$ to 0.82 g/cm$^3$. When the amount of the fire extinguishing agent is greater than or equal to 0.12 g/cm$^3$, the fire extinguishing agent contained in the extinguisher sheet 150 is appropriate for the capacity of battery cells used in the energy storage module 100 including the extinguisher sheet 150 so as to be able to extinguish a fire on any one of the battery cells. When the amount of the fire extinguishing agent is less than or equal to 0.82 g/cm$^3$, the extinguisher sheet 150 may be easily set to operate (e.g., rupture) at about 400° C.

Figure 11B:
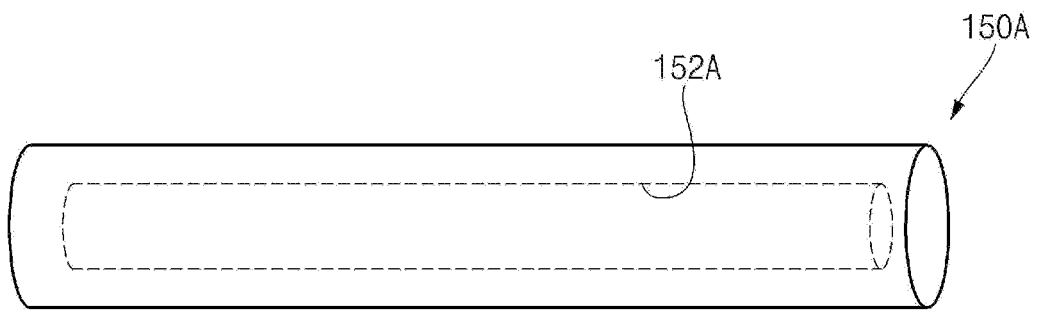

In an embodiment, as shown in FIG. 11B, another example extinguisher sheet 150A may include a tube-type receiving space 152A for receiving (e.g., accommodating or storing) a fire extinguishing agent within the receiving space 152A.

Figure 11C:
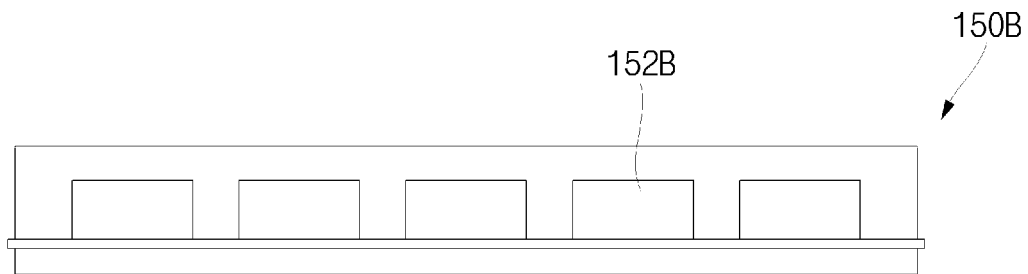

In an embodiment, as shown in FIG. 11C, another example extinguisher sheet 150B may include receiving spaces 152B arranged within the extinguisher sheet 150B to be spaced apart from each other by a regular distance. The receiving spaces 152B may include a plurality of receiving spaces, unlike in the tube-type extinguisher sheet 150A shown in FIG. 11B. The receiving spaces 152B of the extinguisher sheet 150B may open (e.g., rupture) responsive to only one of the battery cells 100, from which a relatively high-temperature gas is generated, to then emit the fire extinguishing agent. Therefore, when the gas is generated from the plurality of battery cells 120, a fire on a corresponding one of the battery cells 120 can be extinguished.

Figure 11D:
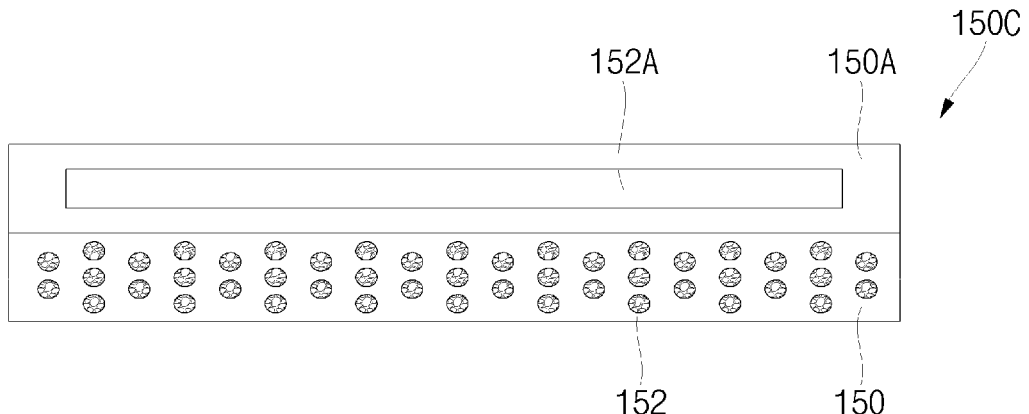

In an embodiment, as shown in FIG. 11D, another example extinguisher sheet 150C may have a multi-layered structure including different types of layers. For example, the extinguisher sheet 150C may include an underlying extinguisher sheet 150 having capsules 152 located therein, and an overlying second extinguisher sheet 150A having a tube-type receiving space 152A. In an embodiment, the first extinguisher sheet 150 and the second extinguisher sheet 150A may be set to operate at different temperatures. Accordingly, the first extinguisher sheet 150 and the second extinguisher sheet 150A may operate in sequence according to the temperature and amount of the discharged gas. In addition, with such double-mode operation of the extinguisher sheet 150C, the extinguisher sheet 150C may operate in sequence according to the temperature and the time of gas generated, thereby constantly emitting the fire extinguishing agent.

Herein, configurations and operations of the battery cells 120 and the insulation spacers 130 in the energy storage module according to an embodiment of the present invention will be described.

Figure 12:
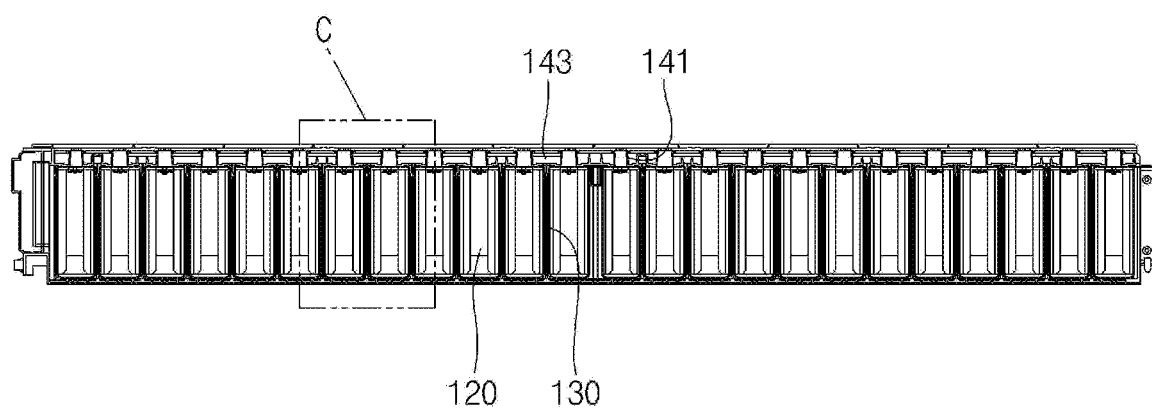
FIG. 12 is a cross-sectional view taken along the line C-C of FIG. 1.
Figure 13:
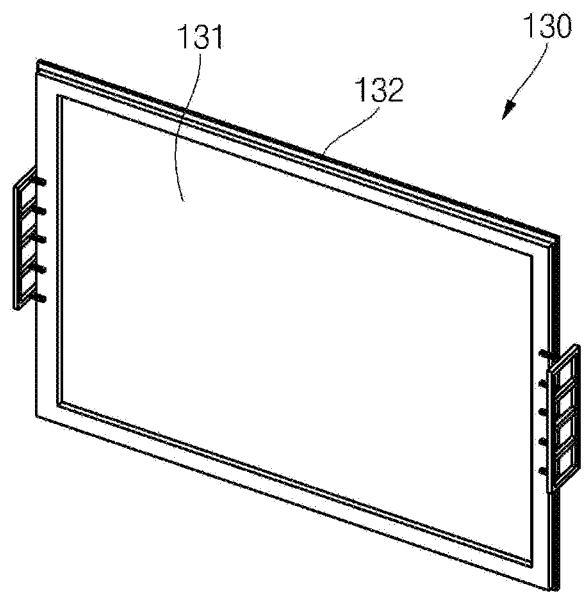
FIG. 13 is a perspective view illustrating an insulation spacer in the energy storage module according to an embodiment of the present disclosure.
Figure 14A:
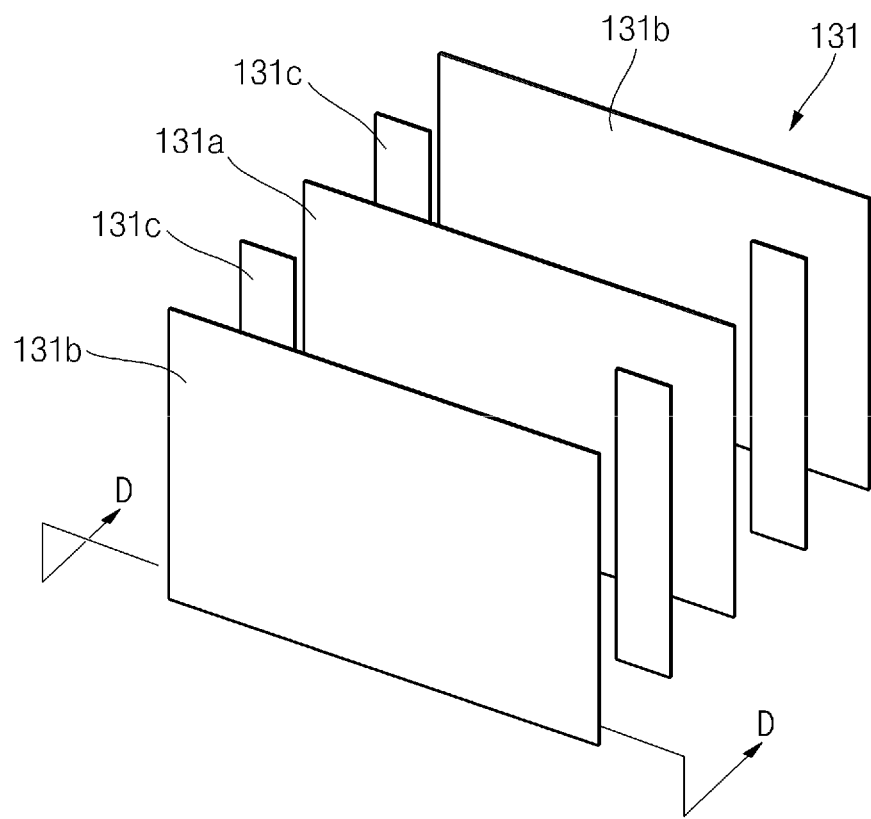
FIGS. 14A and 14B are exploded perspective views illustrating example configurations of sheet parts of the insulation spacers in the energy storage module according to an embodiment of the present disclosure.
Figure 14B:
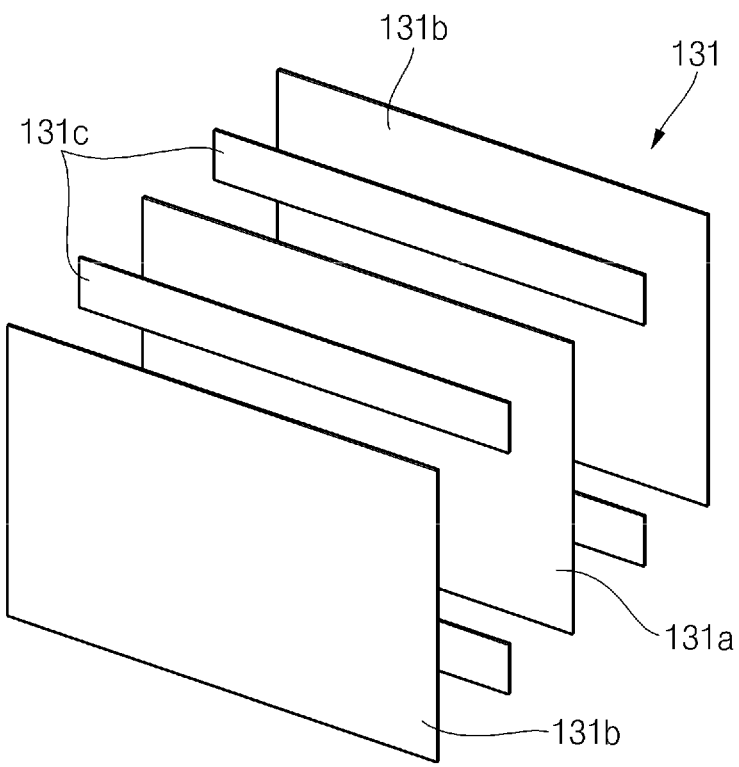
Figure 15:
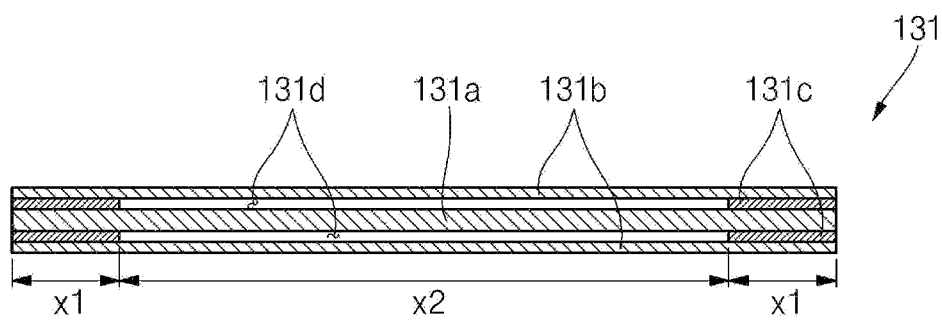
FIG. 15 is a cross-sectional view taken along the line D-D after the sheet parts of FIG. 14A are adhered to each other.
Figure 16:
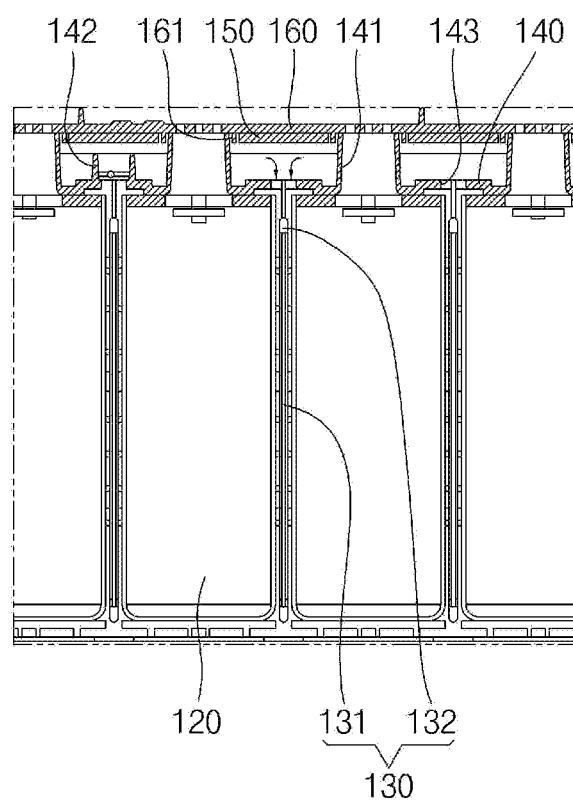
FIG. 16 is an enlarged view of a region "C" of FIG. 12.

FIG. 12 is a cross-sectional view taken along the line C-C of FIG. 1; and FIG. 13 is a perspective view illustrating a configuration of an insulation spacer 130 in the energy storage module according to an embodiment of the present invention. FIGS. 14A and 14B are exploded perspective views illustrating example configurations of sheet parts of insulation spacers 130 according to an embodiment of the present disclosure. FIG. 15 is a cross-sectional view taken along the line D-D after the sheet parts of FIG. 14A are adhered to each other. FIG. 16 is an enlarged view of a region "C" of FIG. 12.

The battery cells 120 may be alternately arranged on a top surface of the bottom plate 111 of the cover member 110 with the insulation spacers 130 (e.g., with the insulation spacers 130 arranged between adjacent ones of the battery cells 120). For example, the battery cells 120 may be arranged in a plurality of columns (e.g., two columns) along the top surface of the bottom plate 111 such that long side surfaces of the battery cells 120 face each other, and the insulation spacers 130 may be positioned between adjacent ones of the long side surfaces of the battery cells 120. In an embodiment, a distance (e.g., a first distance) between long side surfaces of each adjacent pair of the battery cells 100 may be in a range from about 4 mm to about 6 mm. When the first distance is less than or equal to about 4 mm, an air layer may not be easily formed between each of the insulation spacers 130 and each of the battery cells 120, thereby lowering cooling performance. When the first distance is greater than 6 mm, the energy storage module 100 may become unnecessarily bulky.

The insulation spacers 130 positioned between each of (e.g., between adjacent ones of) the battery cells 120 may prevent or substantially prevent the battery cells 120 from contacting one another, thereby maintaining the battery cells 120 in an electrically isolated state. Each of the insulation spacers 130 may have a planar size corresponding to that of the long side surface of one battery cell 120. For example, one surface of the insulation spacer 130 may face the long side surface of one battery cell 120, and the other surface of the insulation spacer 130 may face the long side surface of another battery cell 120.

In addition, the insulation spacer 130 and the long side surface of the battery cell 120 may be spaced apart by a distance (e.g., a predetermined distance) (e.g., a second distance) to establish a passage for external air. The battery cell 120 may be cooled by the external air passing through the external air passage.

In an embodiment, the insulation spacers 130 may include a sheet part (e.g., a sheet) 131 and an edge part (e.g., an edge) 132. In an embodiment, the sheet part 131 may include a flame-retardant (or non-combustible) sheet that prevents (or substantially impedes) a fire from spreading to neighboring battery cells 120, and a heat-insulating sheet that prevents (or substantially impedes) heat from being propagated to neighboring battery cells 120 when a fire starts in any of the battery cells 120. In some embodiments, the sheet part 131 may include a heat-insulating first sheet 131a and a plurality of (e.g., two) flame-retardant (or non-combustible) second sheets 131b adhered to opposite surfaces of the first sheet 131a by one or more adhesion members 131c. The sheet part 131 may have an increased heat insulating effect and may provide flame retardancy (and non-combustibility) by stacking a plurality of layers of the first sheet 131a and the second sheets 131b. For example, the insulation spacers 130 may prevent or substantially prevent heat or flames from propagating to neighboring battery cells 120 through the stacked sheet parts 131 when the temperature of the battery cell 120 rises or flames are generated in the battery cell 120.

The insulation spacers 130 may include a flame-retardant (or non-combustible) sheet that prevents (or substantially impedes) flames from propagating to neighboring battery cells 120 and a heat-insulating sheet that prevents (or substantially impedes) heat from being propagated to neighboring battery cells 120 when a fire starts in any of the battery cells 120, and configurations of the insulation spacers 130 will be described later in further detail.

In an embodiment, the first sheet 131a and the second sheets 131b may have a same size (e.g., a same length and width). In an embodiment, to facilitate movement of the fire extinguishing agent, which will be described later, a thickness of the insulation spacer 130 may not exceed 50% of the first distance (e.g., may not exceed 50% of the distance between the adjacent battery cells 120). For example, when the first distance is about 6 mm, the thickness of the insulation spacer 130 may not exceed about 3 mm. When the first distance is about 4 mm, the thickness of the insulation spacer 130 may not exceed about 2 mm. In one embodiment, the first sheet 131a may have a thickness in a range from about 1 mm to about 1.4 mm. In addition, each of the second sheets 131b may have a thickness in a range from about 0.1 mm to about 0.2 mm, and the adhesive member 131c may have a thickness of about 0.1 mm.

In an embodiment, for example, the first sheet 131a may include (or may be formed of) ceramic paper, and the second sheets 131b may include (or may be formed of) mica paper. In an embodiment, the first sheet 131a may further include an aerogel. In this embodiment, because an air layer is sufficiently provided in the first sheet 131a, heat insulating efficiency can be increased. In an embodiment, the first sheet 131a may include (or may be) ceramic paper made of a fiber-containing refractory insulating material. In an embodiment, the first sheet 131a may include (or may be) bio-soluble fiber ceramic paper containing an alkaline earth metal, which is an eco-friendly high-temperature insulating material that is generally harmless to humans.

In addition, the sheet part 131 may have the same configuration as shown in FIG. 14A or 14B.

As shown in FIGS. 14A and 15, the adhesion member 131c is positioned between the opposite ends of the first sheet 131a and each of the second sheets 131b such that the sheet part 131 has a reference (or predetermined) width. The adhesion member 131c may attach the first sheet 131a and the second sheets 131b to each other. In an embodiment, the adhesion member 131c may have a same length as the first sheet 131a and the second sheets 131b in a length direction. For example, opposite ends x1 of the first sheet 131a may be adhered to respective opposite ends x1 of the second sheets 131b by the adhesion member 131c.

In an embodiment, the adhesion member 131c may have a width in a range from about 10 mm to about 20 mm. Here, if the width of the adhesion member 131c is smaller than about 10 mm, adhesion between the first sheet 131a and the second sheets 131b may be insufficient. If the width of the adhesion member 131c is greater than about 20 mm, an ignition probability may increase due to the adhesion member 131c.

The adhesion member 131c may have any of a variety of adhesive components or configurations, such as a general double-sided tape or an adhesive tape, but the adhesive components and configurations of the adhesion member 131c are not limited thereto.

The adhesion member 131c may attach (e.g., may only attach) the opposite ends x1 of the first sheet 131a to the second sheets 131b such that the first sheet 131a and the second sheets 131b are spaced apart from each other at a central portion x2 of the sheet part 131. As a result, air passages 131d may be defined between the first sheet 131a and the second sheets 131b. In addition, if the sheet part 131 is compressed due to swelling of the battery cell(s) 120, the air passages 131d established at the central portion x2 of the sheet part 131 may reduce (or mitigate) compression of the sheet part 131.

As shown in FIG. 14B, according to another embodiment, the sheet part 131 may be configured such that the adhesion member 131c is located at an area at (or adjacent to) top and bottom ends of the first sheet 131a to attach the first sheet 131a and the second sheets 131b to each other. In an embodiment, the adhesion member 131c may have a same width as the first sheet 131a and the second sheets 131b in a width direction. For example, the top and bottom ends of the first sheet 131a may be respectively adhered to top and bottom ends of the second sheets 131b by the adhesion member 131c.

In an embodiment, when the sheet part 131 has a width-direction size less than twice a height-direction size thereof, as shown in FIG. 14A, the adhesion member 131c may be attached to the opposite ends of the sheet part 131. However, when the width-direction size of the sheet part 131 is greater than or equal to twice the height-direction size thereof, an adhesion area (e.g., a vertical adhesion area) may be reduced relative to the overall area of the sheet part 131 due to an area occupied by the adhesion member 131c attached to the opposite ends of the sheet part 131, thereby lowering adhesion performance.

Therefore, in an embodiment, when the width-direction size of the sheet part 131 is greater than twice the height-direction size, the adhesion member 131c may be applied to the top and bottom ends thereof to increase the adhesion area, thereby improving the adhesion performance. The configuration of the sheet part 131 shown in FIG. 14B may be substantially the same as the sheet part 131 shown in FIGS. 14A and 15, except for positions of the adhesion member(s) 131c.

However, when the adhesion member 131c is applied to the top and bottom ends of the sheet part 131, the adhesion performance may be improved, and, in some embodiments, no edge part (described below) may be separately required (e.g., an edge part may be omitted).

In some embodiments, an edge part 132 may be provided along peripheral edges of the sheet part 131. In an embodiment, the edge part 132 may include (or may be made of) a plastic material, such as a general polyethylene or polypropylene, and may be coupled to edges of the sheet part 131 by using a double injection process to fix the shape of the sheet part 131. In some embodiments, the edge part 132 may have a width in a range from about 3 mm to about 6 mm. If the width of the edge part 132 is smaller than about 3 mm, the sheet part 131 may not be easily fixed, and if the width of the edge part 132 is greater than about 6 mm, an ignition probability of the edge part 132 made of a plastic material may be increased.

As discussed above, when a fire extinguishing agent is applied from top portions of the insulation spacers 130, the fire extinguishing agent may move downwardly along the surfaces of the sheet part 131. Therefore, the fire extinguishing agent may contact the case 121 of the adjacent battery cells 120, thereby performing extinguishing and cooling operations on the battery cells 120. Herein, movement of the fire extinguishing agent will be described in further detail.

As shown in FIG. 16, the top plate 140 may further include the openings 143 respectively located to correspond to (e.g., located over or above) the insulation spacers 130. Accordingly, the fire extinguishing agent, when emitted from the extinguisher sheet 150, may pass through the top plate 140 through the openings 143 of the top plate 140 to reach the insulation spacers 130. In addition, the fire extinguishing agent may move along surfaces of the insulation spacers 130 that face the case 121 of the adjacent battery cells 120, thereby extinguishing any fire and cooling the battery cells 120. The fire extinguishing agent is emitted by the extinguisher sheet 150 located over one or more of the battery cells 120, the temperature of which is higher than a reference temperature. Therefore, the fire extinguishing agent may be sprayed from a top portion of the battery cell 120 having an elevated temperature. In addition, since the fire extinguishing agent moves along the surfaces of the insulation spacers 130 positioned at front and rear sides of the corresponding battery cell 120, both extinguishing and cooling of the corresponding battery cell 120 can be performed.

Herein, a configuration of an energy storage module according to another embodiment of the present invention will be described.

Figure 17:
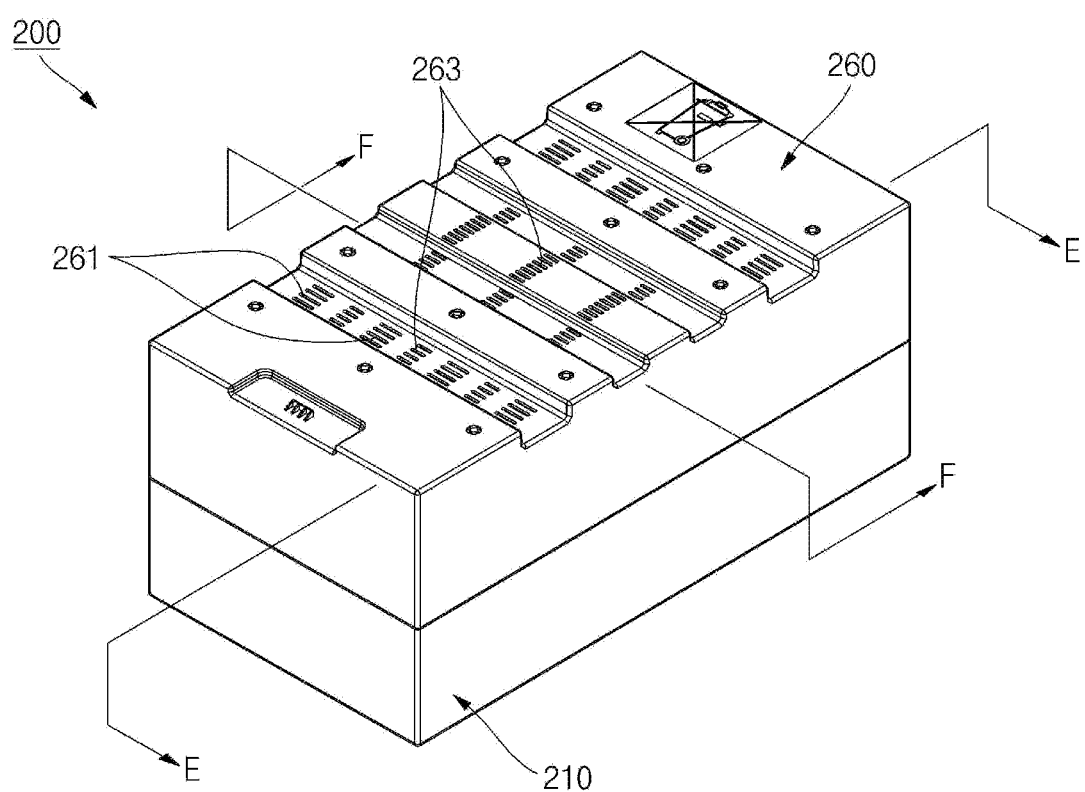
FIG. 17 is a perspective view of an energy storage module according to an embodiment of the present disclosure.
Figure 18:
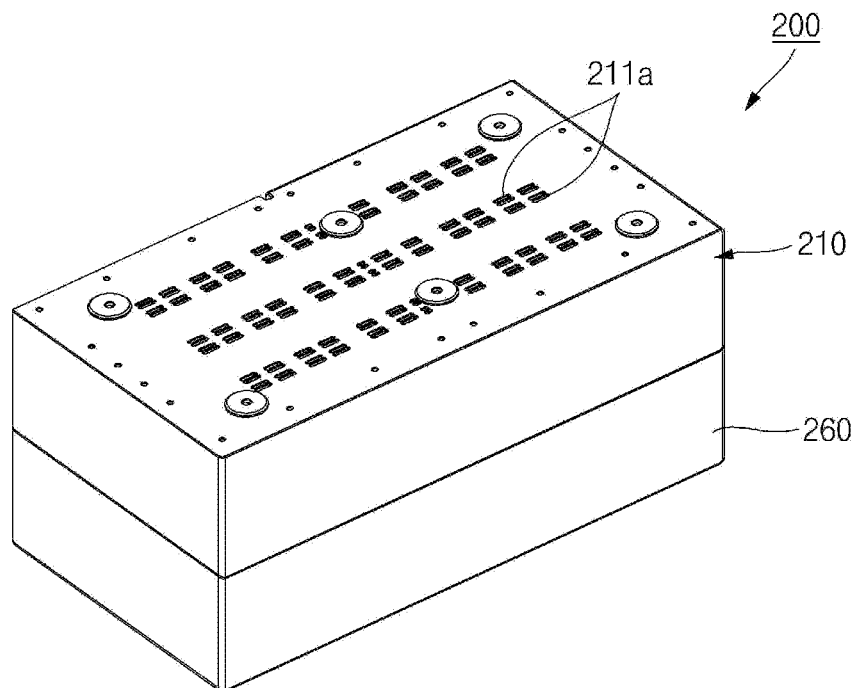
FIG. 18 is a bottom perspective view of the energy storage module shown in FIG. 17.
Figure 19:
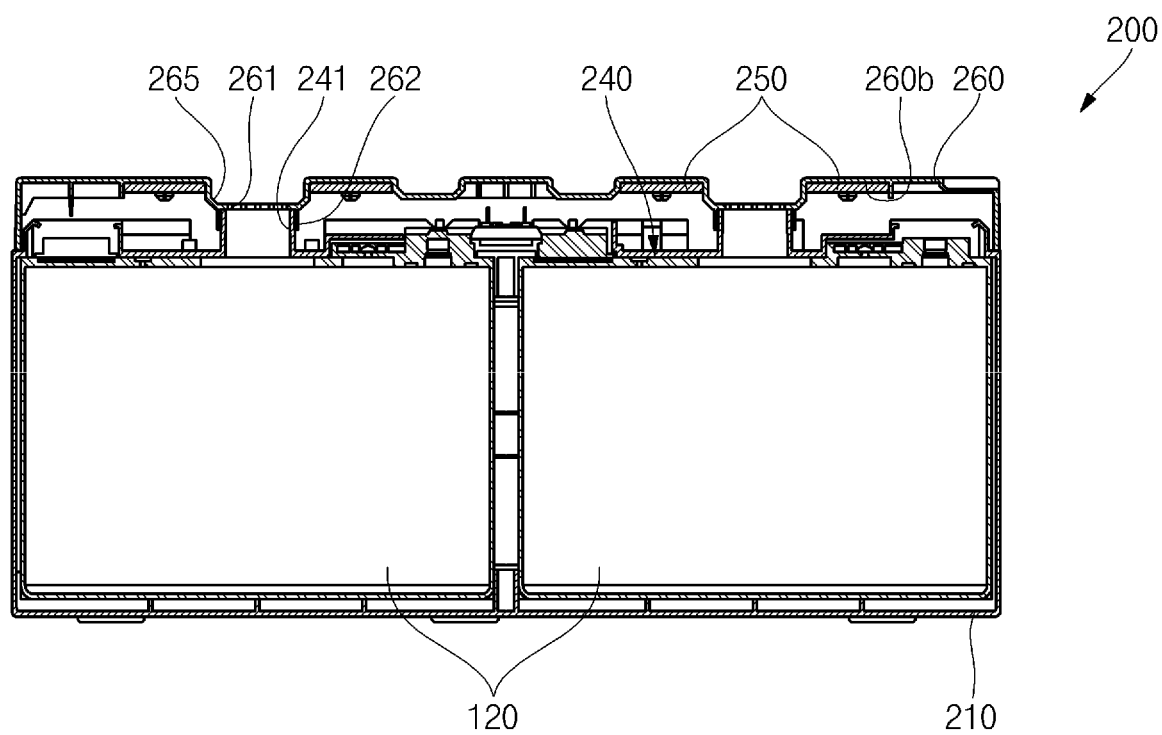
FIG. 19 is a cross-sectional view taken along the line E-E of FIG. 17.
Figure 20:
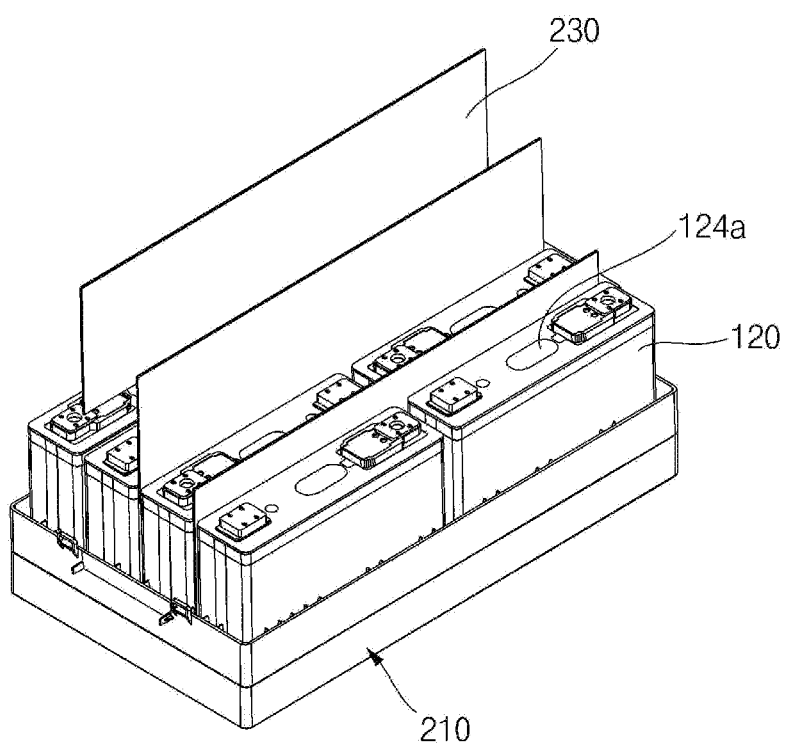
FIG. 20 is a perspective view illustrating a state in which battery cells and insulation spacers are arranged in a cover member of the energy storage module according to an embodiment of the present disclosure.

FIG. 17 is a perspective view of an energy storage module according to another embodiment of the present invention; FIG. 18 is a bottom perspective view of the energy storage module shown in FIG. 17; FIG. 19 is a cross-sectional view taken along the line E-E of FIG. 17; and FIG. 20 is a perspective view illustrating battery cells and insulation spacers arranged in a cover member of the energy storage module shown in FIGS. 17 to 19.

Referring to FIGS. 17 to 20, an energy storage module 200 according to another embodiment of the present disclosure may include a cover member 210, battery cells 120, insulation spacers 230, a top plate 240, an extinguisher sheet 250, and a top cover 260.

The cover member 210, the top plate 240, the extinguisher sheet 250, and the top cover 260 may be similarly configured to those of the energy storage module 100 described above. In addition, the battery cells 120 may be the same (or substantially the same) as those of the energy storage module 100. Accordingly, the following description will focus on differences between the energy storage module 200 and the energy storage module 100.

The cover member 210 may include a bottom plate 211, an end plate (or a plurality of end plates) 212, and a side plate (or a plurality of side plates) 213 which together form a space in which the battery cells 120 and the insulation spacers 230 are alternately arranged with the battery cells 120 on the bottom plate 211. In addition, the cover member 210 may fix positions of the battery cells 120 and the insulation spacers 230 and may protect the battery cells 120 from external impacts. In addition, the bottom plate 211 may further include openings (e.g., through-holes) 211a, through which the fire extinguishing agent from the extinguisher sheet 250 and the air moving along the exterior surfaces of the insulation spacers 230 are exhausted. The through-holes 211a may be positioned to correspond to the insulation spacers 230.

The insulation spacers 230 are positioned between adjacent ones of the battery cells 120 to prevent or substantially prevent the battery cells 120 from contacting one another, thereby maintaining the cases 121 of the battery cells 120 in electrically isolated states. In an embodiment, each of the insulation spacers 230 may have side surfaces, each having a planar size sufficient to entirely cover the long side surfaces of two adjacent battery cells 120. For example, one of the insulation spacers 230 may be positioned between each group of four adjacent battery cells 120, which are arranged such that long side surfaces of two of the four battery cells 120 face each other. In addition, a distance is maintained between each of the insulation spacers 230 and the battery cells 120 to establish external air passages and/or fire extinguishing agent passages, thereby allowing for cooling of the battery cells 120. The insulation spacers 230 may include (or may be made of) a flame-retardant (or non-combustible) sheet that prevents (or substantially mitigates) a fire from spreading to neighboring battery cells and a heat-insulating sheet that prevents (or substantially mitigates) heat from propagating to neighboring battery cells when a fire outbreaks in any of the battery cells 120. The configurations of the insulation spacers 230 will be described in further detail below.

The top plate 240 may be coupled to a top portion of the cover member 210. The top plate 240 may be coupled to the cover member 210 while covering top portions of the battery cells 120.

The top plate 240 includes ducts 241 respectively corresponding to the vents 124a located on a top surface of each of the battery cells 120. The ducts 241 may be arranged along a direction, for example, in a length direction of the top plate 240. Accordingly, if the vent 124a ruptures, the gas discharged through the vent 124a of the battery cell 120 may move upwardly along the ducts 241 of the top plate 240. Configurations and operations of the ducts 241 will be described later in further detail.

The extinguisher sheet 250 is positioned between the top plate 240 and the top cover 260. The extinguisher sheet 250 may include a plurality of planar sheets located at opposite sides of the ducts 241 of the top plate 240 and extending in a length direction of the top plate 240. The extinguisher sheet 250 may be mounted on a bottom surface 260b of the top cover 260. Here, the length direction may refer to a direction in which the ducts 241 of the top plate 240 extend.

The top cover 260 is coupled to the top portion of the top plate 240. The top cover 260 may cover the top plate 240 and the extinguisher sheet 250, thereby protecting the top plate 240 and the extinguisher sheet 250 from external impacts applied to a top surface of the top cover 260. In addition, the top cover 260 may include discharge openings (e.g., discharge holes) 261. In addition, the top cover 260 may also include protrusion parts (e.g., protrusions) 262 spaced apart from (e.g. may extend around) the outer periphery of respective ones of the discharge holes 261. The protrusion parts 262 may protrude downwardly. The ducts 241 may be respectively coupled to (e.g., may respectively extend into) the interior of the protrusion parts 262. Each of the discharge holes 261 may include a plurality discharge holes arranged in one direction, for example, in a length direction of the top cover 260. In addition, the discharge holes 261 may be positioned to correspond to the ducts 241 of the top plate

240. In addition, the discharge holes 261 may also be provided as a plurality of openings passing through top and bottom surfaces of the top cover 260 and spaced apart from one another. Accordingly, if the vent 124a ruptures, the gas discharged from the vent 124a of the battery cell 120 may be discharged to the exterior side along the duct 241 of the top plate 240 and the discharge hole 261 of the top cover 260.

In an embodiment, the top cover 260 may further include through-holes 263, through which the fire extinguishing agent of the extinguisher sheet 250 is exhausted and the air moving along the exterior surfaces of the insulation spacers 230 is exhausted. The through-holes 263 may be positioned to respectively correspond to the insulation spacers 230.

In an embodiment, recess parts (e.g., recessed portions or recesses) 265, each having a lower height (e.g., a lower height above the battery cells 120) than other areas of the top cover 260, may be provided in a length direction of the top cover 260, and the discharge holes 261 may be arranged at the recess parts 265. With this configuration, the gases discharged through the ducts 241 and the discharge holes 261 may gather in the recess parts 265, and the gas may be discharged to the exterior side by using, for example, a separate fan or a suction structure (e.g., a vacuum), thereby allowing the gas generated by the battery cells 120 to be discharged quickly.

Herein, configurations and operations of battery cells 120 and insulation spacers 230 in an energy storage module according to an embodiment of the present disclosure will be described.

Figure 21A:
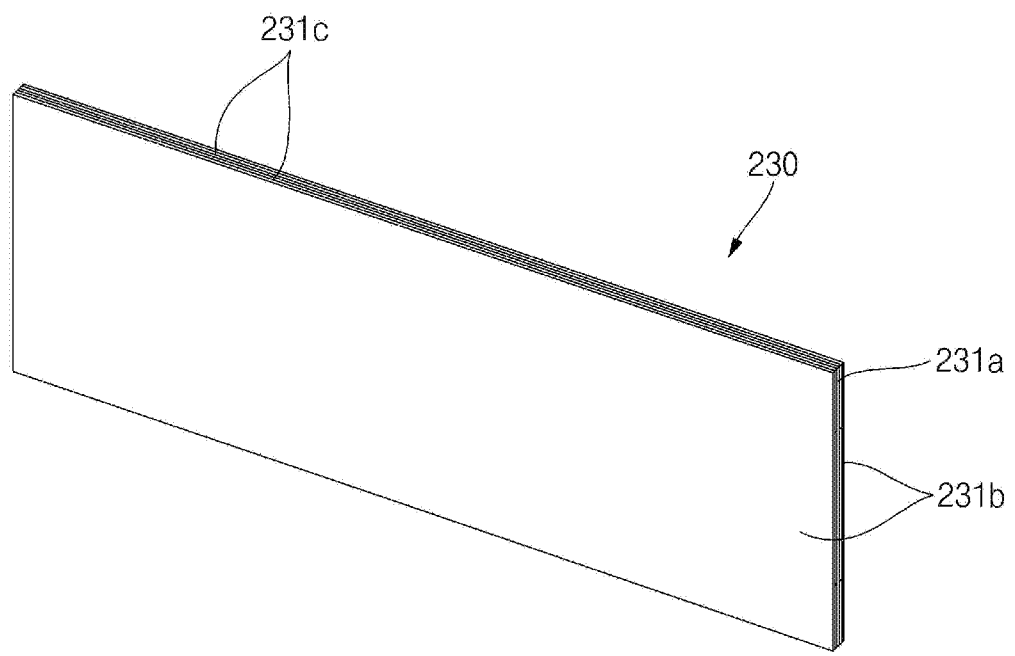
FIGS. 21A and 21B are a perspective view and an exploded perspective view, respectively, illustrating configurations of insulation spacers in the energy storage module shown in FIGS. 17 to 20.
Figure 21B:
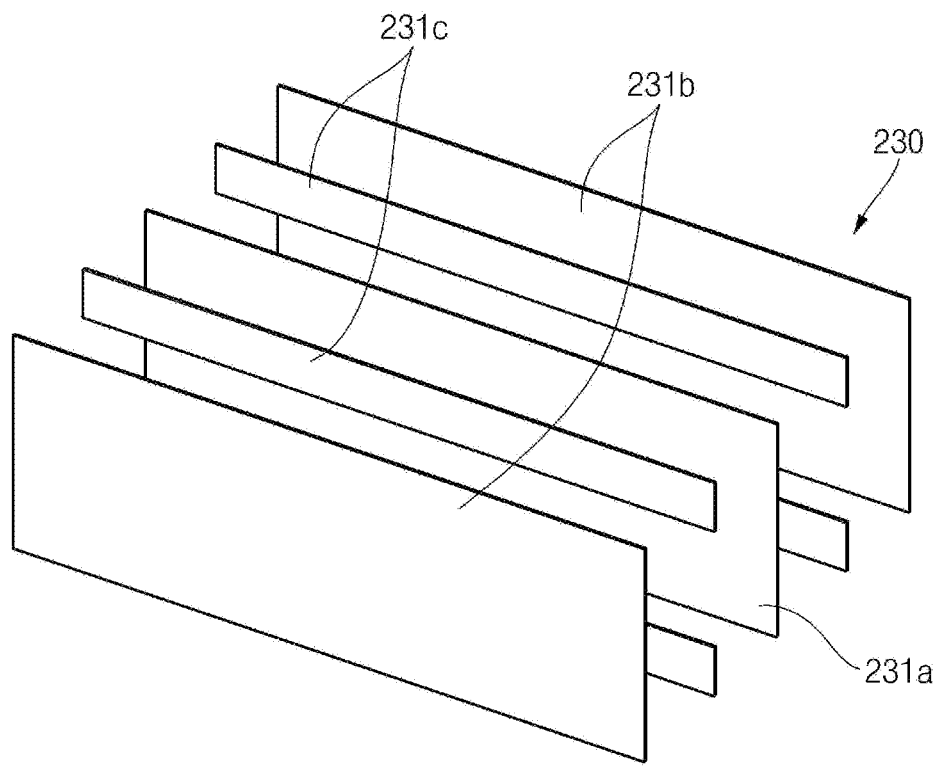
Figure 22:
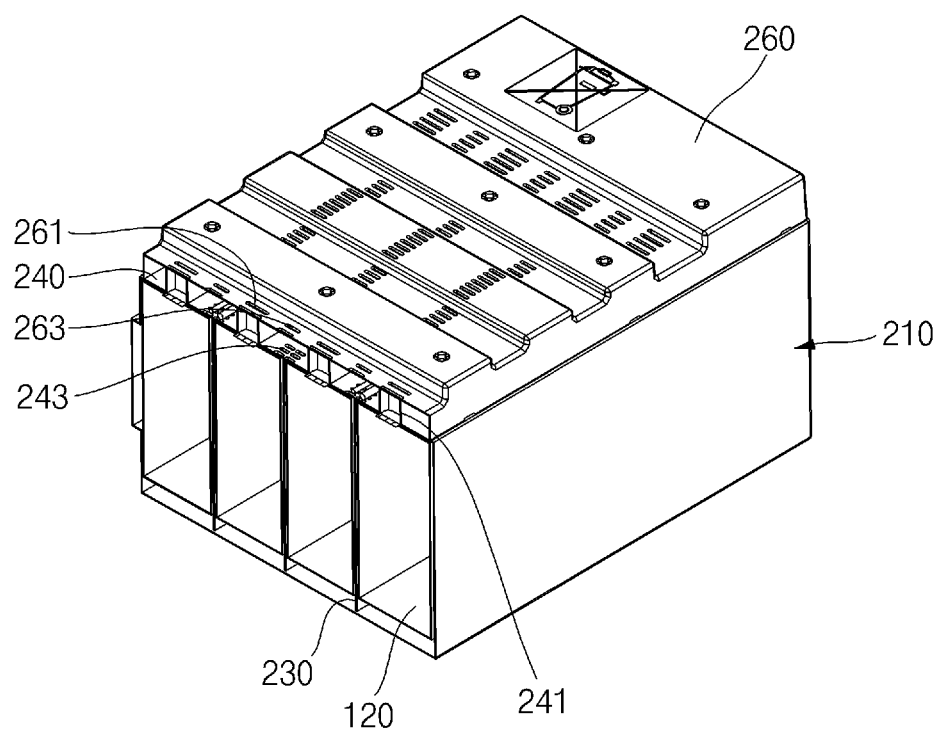
FIG. 22 is a cross-sectional view taken along the line F-F of FIG. 17.

FIGS. 21A and 21B are a perspective view and an exploded perspective view, respectively, illustrating configurations of insulation spacers to be used in the energy storage module 200 shown in FIGS. 17 to 20; and FIG. 22 is a cross-sectional view taken along the line F-F of FIG. 17.

The battery cells 120 may be alternately arranged on a top surface of the bottom plate 211 of the cover member 210 with the insulation spacers 230. In an embodiment, each of the insulation spacers 230 may have side surfaces, each having a planar size sufficient to entirely cover the long side surfaces of two adjacent battery cells 120. For example, one of the insulation spacers 230 may have one surface entirely covering long side surfaces of two of the four battery cells 120 and the other surface entirely covering long side surfaces of the two battery cells 120. In an embodiment, one surface of one of the insulation spacers 230 may entirely cover the long side surfaces of two adjacent battery cells 120, and the other surface of the insulation spacer 230 may entirely cover the long side surfaces of two adjacent battery cells 120. In other words, the insulation spacers 230 may be positioned between each group of four adjacent battery cells 120, which are arranged such that long side surfaces of two of the four battery cells 120 face each other.

In an embodiment, the battery cells 120 may be arranged such that the long side surface of one of the battery cells 120 is spaced a distance (e.g., a reference or predetermined distance) apart from a long side surface of another (e.g., an adjacent) one of the battery cells 120, and the insulation spacers 230 are positioned between the neighboring battery cells 120.

In an embodiment, the distance (e.g., the first distance) between the long side surfaces of the two neighboring battery cells 120 may be in a range from about 3.5 mm to about 4.5 mm. If the first distance is smaller than 3.5 mm, it is not easy to provide air layers between the battery cells 120 and the insulation spacers 230, thereby lowering cooling efficiency. If the first distance is greater than 4.5 mm, the energy storage module 200 may become unnecessarily bulky.

The insulation spacers 230 positioned between each of the battery cells 120 may prevent or substantially prevent the battery cells 120 from contacting each other, thereby maintaining the cases 121 of the battery cells 120 in an electrically isolated state. In addition, the insulation spacer 230 and the long side surface of the battery cell 120 may be spaced apart by a distance (e.g., a second distance) to establish a passage for external air. The battery cell 120 may be cooled by the external air passing through the external air passage.

In an embodiment, the insulation spacers 230 may include only a sheet part (e.g., a sheet) without a separate edge part. The sheet part may include a flame-retardant (or non-combustible) sheet that prevents (or substantially impedes) a fire from spreading to neighboring battery cells 120, and a heat-insulating sheet that prevents (or substantially impedes) heat from being propagated to neighboring battery cells 120 when a fire starts in any of the battery cells 120. In some embodiments, the insulation spacers 230 may include a heat-insulating first sheet 231a and a plurality of (e.g., two) flame-retardant (or non-combustible) second sheets 231b adhered to opposite surfaces of the first sheet 231a by one or more adhesion member(s) 231c. In an embodiment, the first sheet 231a and the second sheets 231b may have a same size (e.g., a same length and width). In an embodiment, to facilitate movement of the fire extinguishing agent, which will be described later, a thickness of the insulation spacer 230 may not exceed 50% of the first distance.

The adhesion member 231c may be positioned between top and bottom ends of the first sheet 231a and each of the second sheets 231b such that the sheet part has a certain width (e.g., a predetermined width), and may attach the first sheet 231a and the second sheets 231b to each other. In an embodiment, the adhesion member 231c may have a same width as the first sheet 231a and the second sheets 231b in a width direction. For example, the top and bottom ends of the first sheet 231a may be adhered to respective top and bottom ends of the second sheets 231b by the adhesion member 231c.

In an embodiment, if the insulation spacers 230 have a width-direction size greater than twice a height-direction size thereof, the first sheet may be adhered at the top and bottom ends thereof by the adhesion member 231c, thereby improving the adhesion performance. For example, when the width-direction size of the insulation spacers 230 is greater than or equal to twice the height-direction size thereof, the adhesion performance may be lowered when the first sheet 231a and the second sheets 231b are adhered to each other at the opposite ends of the insulation spacers 230 by the adhesion member 231c (see FIG. 14A). The insulation spacers 230 may have a same configuration as that of the insulation spacers 230 shown in FIG. 21B.

As discussed above, if a fire extinguishing agent is applied from top portions of the insulation spacers 230, the fire extinguishing agent may move downwardly along the surfaces of the insulation spacers 230. Therefore, the fire extinguishing agent may contact the case 121 of the adjacent battery cells 120, thereby extinguishing any fire and cooling the battery cells 120. Herein, the movement of the fire extinguishing agent and the cooling of the battery cells 120 using the air will be described in further detail.

As shown in FIG. 22, the top plate 240 may further include openings (e.g., opening holes) 243 located to respectively correspond to the insulation spacers 230. Accordingly, the fire extinguishing agent emitted from the extinguisher sheet 250 may pass through the top plate 240 through the openings 243 of the top plate 240 to reach the insulation spacers 230. In addition, the fire extinguishing agent may move along surfaces of the insulation spacers 230 that face the case 121 of the battery cells 120, thereby extinguishing and cooling the battery cells 120. The fire extinguishing agent is emitted (or sprayed) from the extinguisher sheet 250 above one or more of the battery cells 120, the temperature of which is higher than a reference temperature. Therefore, the fire extinguishing agent may be sprayed from a top portion of the battery cell 120, the temperature of which has increased. In addition, since the fire extinguishing agent moves along the surfaces of the insulation spacers 230 positioned at front and rear sides of the corresponding battery cell 120, both extinguishing and cooling of the corresponding battery cell 120 can be performed.

In an embodiment, the top cover 260 may further include through-holes 263 that pass through top and bottom surfaces of the top cover 260 and are located to respectively correspond to the openings 243. For example, the through-holes 263 may respectively correspond to the insulation spacers 230.

In an embodiment, the bottom plate 211 of the cover member 210 may also include through-holes 211a located to respectively correspond to the insulation spacers 230. Thus, air introduced through the openings 263 of the top cover 260 and the openings 243 of the top plate 240 may move along spaces provided between the insulation spacers 230 and the battery cells 120 to be discharged through the through-holes 211a of the bottom plate 211. Of course, the movement of the air (e.g., the airflow direction) may be reversed. In such a way, air passages may be provided by the through-holes 211a, 263, and the openings 243, thereby improving cooling efficiency.

Herein, a configuration of a battery cell 120 used in the energy storage module 100 or the energy storage module 200 according to the embodiments of the present invention will be described in further detail.

Figure 23A:
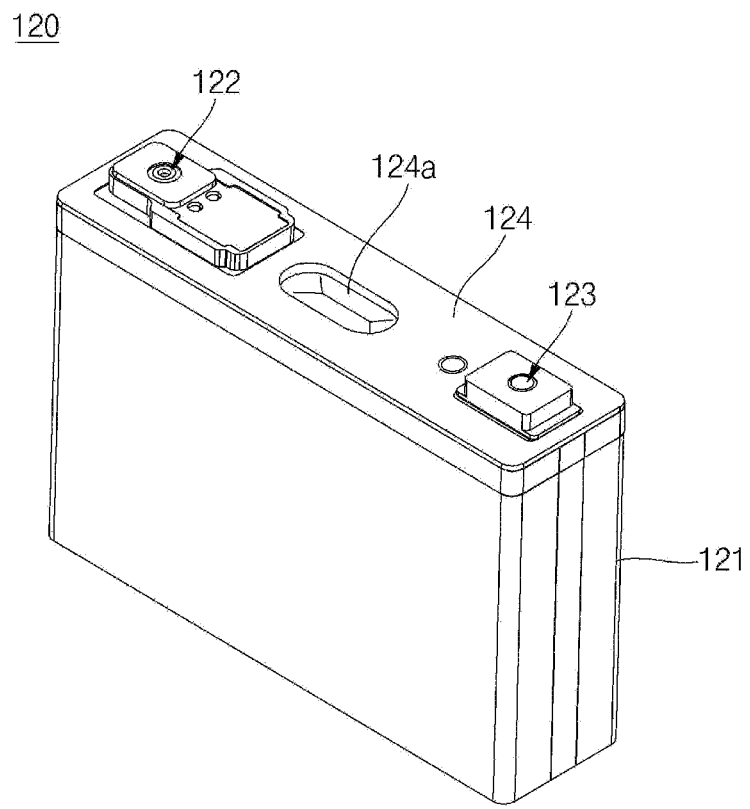
FIGS. 23A and 23B are a perspective view and a cross-sectional view, respectively, of a battery cell used in an energy storage module according to an embodiment of the present disclosure.
Figure 23B:
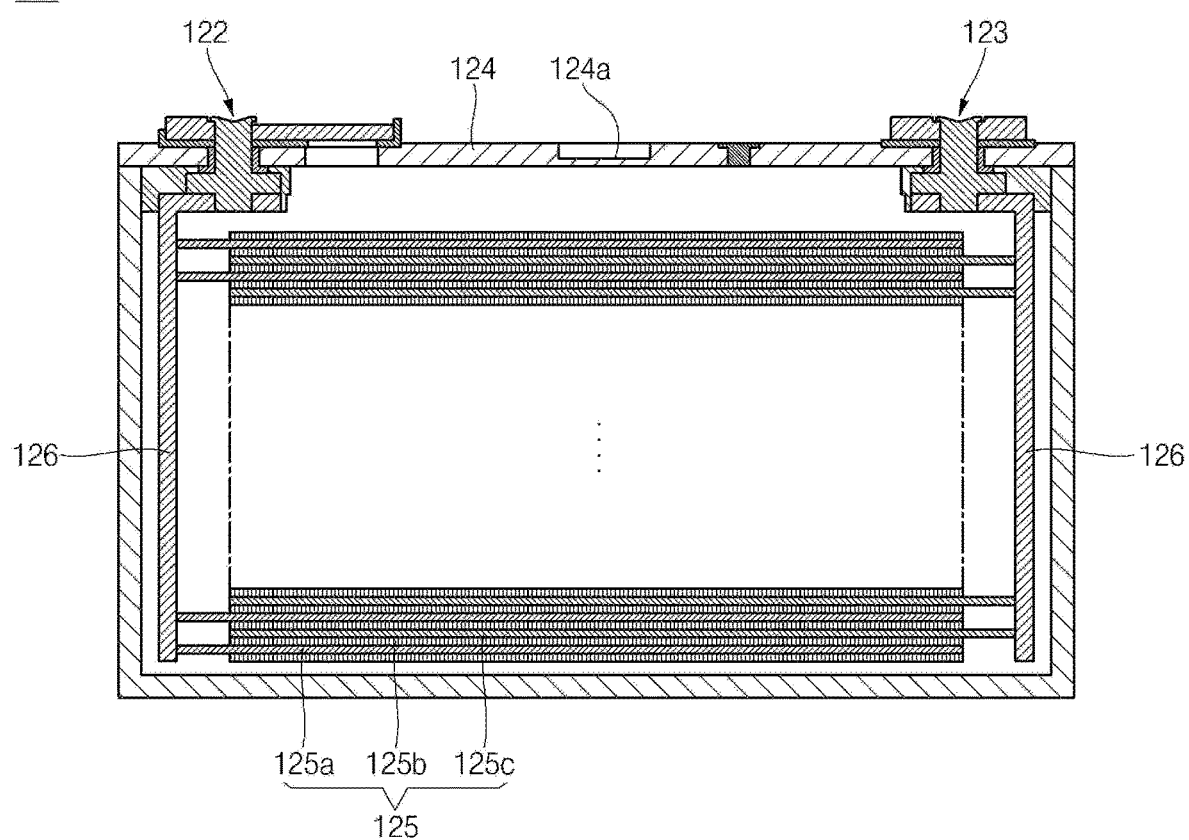

FIGS. 23A and 23B are a perspective view and a cross-sectional view, respectively, of a battery cell used in an energy storage module according to an embodiment of the present disclosure.

Referring to FIGS. 23A and 23B, the battery cell 120 is configured such that an electrode assembly 125 is accommodated in a case 121, and a cap plate 124 covers a top portion of the case 121. In an embodiment, a vent 124a having a smaller thickness than other regions is located approximately at a center of the cap plate 124. A duct 141 of the top plate 140 is located to correspond to a top portion of the vent 124a, as described above.

In addition, the electrode assembly 125 may be electrically connected to a first electrode terminal 122 and a second electrode terminal 123 located on the cap plate 124 through a pair of current collectors 126. For the sake of convenience, in the following description, the first electrode terminal 122 will be referred to as a negative electrode terminal and the second electrode terminal 123 will be referred to as a positive electrode terminal, but polarities thereof may be reversed.

The electrode assembly 125 may include a negative electrode 125a, a positive electrode 125b positioned to face the negative electrode 125a, and a separator 125c positioned between the negative electrode 125a and the positive electrode 125b, and the electrode assembly 125 may be accommodated in the case 121 together with an electrolyte (not shown).

While some example embodiments have been described to practice the energy storage module of the present disclosure, it will be understood by those of ordinary skill in the art that various changes in form and details may be made therein without departing from the spirit and scope of the present disclosure as set forth by the following claims.

What is claimed is:

1. An energy storage module comprising:
   a plurality of battery cells arranged in a length direction such that long side surfaces of adjacent ones of the battery cells face one another, each of the battery cells comprising a vent;
   a plurality of insulation spacers, at least one of the insulation spacers being located between the long side surfaces of each adjacent pair of the battery cells;
   a cover member comprising an internal receiving space configured to accommodate the battery cells and the insulation spacers;
   a top plate coupled to a top portion of the cover member and comprising ducts respectively corresponding to the vents of the battery cells, and opening holes respectively corresponding to the insulation spacers;
   a top cover coupled to a top portion of the top plate and comprising discharge holes respectively corresponding to the ducts; and
   an extinguisher sheet located between the top cover and the top plate, configured to emit a fire extinguishing agent at a temperature exceeding a certain temperature, and comprising opening holes positioned to correspond to the ducts,
   wherein the insulation spacers comprise a heat-insulating first sheet and a plurality of flame-retardant second sheets respectively adhered to opposite surfaces of the first sheet by an adhesion member.

2. The energy storage module of claim 1, wherein the first sheet comprises ceramic paper, and the second sheets comprise mica paper.

3. The energy storage module of claim 2, wherein the first sheet comprises a ceramic fiber comprising an alkaline earth metal.

4. The energy storage module of claim 1, wherein the long side surfaces of adjacent ones of the battery cells, which face each other, are spaced apart from each other by a first distance, and wherein a thickness of each of the insulation spacers is less than 50% of the first distance.

5. The energy storage module of claim 1, wherein the fire extinguishing agent emitted from the extinguisher sheet is applied to spaces between the insulation spacers and the battery cells through the opening holes of the top plate to be brought into contact with the long side surfaces of the battery cells.

6. The energy storage module of claim 1, wherein each of the insulation spacers has a width-direction size less than twice a height-direction size thereof, and
   wherein the first sheet is adhered to the second sheets at opposite ends thereof by the adhesion member.

7. The energy storage module of claim 6, wherein each of the insulation spacers further comprises an edge part comprising a plastic material, and wherein the edge part is formed at peripheral edges of a sheet part by insert molding to cover the peripheral edges of the sheet part.

8. The energy storage module of claim 6, wherein the first sheet and the second sheets are spaced apart from each other at central portions thereof to define air passages.

9. The energy storage module of claim 1, wherein a width-direction size of the insulation spacers is greater than twice a height-direction size thereof, and the first sheet and the second sheets respectively have a region adhered to each other from top and bottom ends thereof by the adhesion member.

10. The energy storage module of claim 1, wherein the extinguisher sheet comprises a receiving space receiving the fire extinguishing agent within an external case made of polyurea and polyurethane.

11. The energy storage module of claim 10, wherein the receiving space comprises one or more capsules or tubes.

12. The energy storage module of claim 11, wherein the fire extinguishing agent comprises halogen carbon.

13. The energy storage module of claim 1, wherein the extinguisher sheet comprises a plurality of sheets respectively configured to emit the fire extinguishing agent at different temperatures.

14. The energy storage module of claim 1, wherein a ratio of the fire extinguishing agent in the extinguisher sheet to a total weight of the extinguisher sheet is in a range from 30% to 50%.

15. The energy storage module of claim 1, wherein an amount of the fire extinguishing agent in the extinguisher sheet is in a range from $0.12$ g/cm$^3$ to $0.82$ g/cm$^3$.

* * * * *